(12) United States Patent
Kovacs

(10) Patent No.: US 10,947,734 B2
(45) Date of Patent: Mar. 16, 2021

(54) RETENTION APPARATUS, SYSTEM AND METHOD

(71) Applicant: PMC Industries, Inc., Plainville, CT (US)

(72) Inventor: Tamas Kovacs, Burlington, CT (US)

(73) Assignee: PMC Industries, Inc., Plainville, CT (US)

( * ) Notice: Subject to any disclaimer, the term of this patent is extended or adjusted under 35 U.S.C. 154(b) by 0 days.

(21) Appl. No.: 15/853,903

(22) Filed: Dec. 25, 2017

(65) Prior Publication Data
US 2018/0119425 A1     May 3, 2018

Related U.S. Application Data

(63) Continuation-in-part of application No. 15/254,892, filed on Sep. 1, 2016, now Pat. No. 9,850,661.

(60) Provisional application No. 62/461,780, filed on Feb. 21, 2017, provisional application No. 62/219,657, filed on Sep. 16, 2015, provisional application No. 62/218,567, filed on Sep. 14, 2015.

(51) Int. Cl.
| | |
|---|---|
| *E04D 13/10* | (2006.01) |
| *E04C 2/40* | (2006.01) |
| *F24S 25/615* | (2018.01) |
| *F24S 25/632* | (2018.01) |
| *F24S 25/636* | (2018.01) |
| *F24S 25/33* | (2018.01) |
| *E04D 3/361* | (2006.01) |
| *E04D 1/26* | (2006.01) |

(52) U.S. Cl.
CPC ............... *E04D 13/10* (2013.01); *E04C 2/40* (2013.01); *F24S 25/33* (2018.05); *F24S 25/615* (2018.05); *F24S 25/632* (2018.05); *F24S 25/636* (2018.05); *E04D 1/265* (2013.01); *E04D 2003/3615* (2013.01); *Y02B 10/20* (2013.01); *Y02E 10/47* (2013.01)

(58) Field of Classification Search
CPC ....... E04D 13/10; E04G 21/3285; F16B 5/06; F16B 2200/403; F24S 25/63; F24S 25/70; F24S 25/615; F24S 25/636; Y02B 10/12; Y02B 10/20; Y02E 10/47; Y02E 10/50; Y10T 24/44026; Y10T 24/44974
USPC ...... 52/25; 248/224.61, 229.1, 237; 361/825
See application file for complete search history.

(56) References Cited

U.S. PATENT DOCUMENTS

| | | | | |
|---|---|---|---|---|
| 5,176,462 | A * | 1/1993 | Chen | A47F 5/105 160/135 |
| D359,149 | S * | 6/1995 | Nozaki | D34/29 |
| 6,371,687 | B1 * | 4/2002 | Heintz | E02D 29/1409 404/26 |
| 7,703,256 | B2 * | 4/2010 | Haddock | F16B 5/0004 52/24 |

(Continued)

*Primary Examiner* — Brian E Glessner
*Assistant Examiner* — James J Buckle, Jr.
(74) *Attorney, Agent, or Firm* — Damian Wasserbauer, Esq.; Wasserbauer Law LLC

(57) ABSTRACT

An a clamp connector apparatus, system, and method for mounting a solar panel to a cross member while retaining snow, ice, items and other objects on a wall, rooftop and other structure. A clamp mounting apparatus, system, and method for mounting the retention apparatus and system to a stanchion assembly for a membrane roof thereby joining the cross member anchor assembly to a latch assembly of top block.

8 Claims, 11 Drawing Sheets

(56) References Cited

U.S. PATENT DOCUMENTS

| | | | | |
|---|---|---|---|---|
| 8,065,838 B2* | 11/2011 | Hockman | | E04D 13/10 |
| | | | | 52/24 |
| 8,122,648 B1* | 2/2012 | Liu | | F24S 25/61 |
| | | | | 52/58 |
| 8,245,454 B2* | 8/2012 | Stearns | | E04D 13/10 |
| | | | | 52/58 |
| 8,272,172 B2* | 9/2012 | Li | | F24J 2/5205 |
| | | | | 248/237 |
| 8,505,864 B1* | 8/2013 | Taylor | | F24J 2/5258 |
| | | | | 248/226.12 |
| 8,539,719 B2* | 9/2013 | McPheeters | | E04D 13/1476 |
| | | | | 52/27 |
| 8,627,617 B2* | 1/2014 | Haddock | | F24J 2/5249 |
| | | | | 136/251 |
| 8,640,401 B2* | 2/2014 | Hong | | H02S 20/23 |
| | | | | 52/173.3 |
| 8,740,163 B1* | 6/2014 | Taylor | | F24S 25/615 |
| | | | | 248/237 |
| 8,756,881 B2* | 6/2014 | West | | H01L 31/0481 |
| | | | | 52/173.3 |
| 8,935,893 B2* | 1/2015 | Liu | | F16L 3/06 |
| | | | | 52/173.3 |
| 8,938,932 B1* | 1/2015 | Wentworth | | H02S 20/23 |
| | | | | 52/747.1 |
| D751,024 S* | 3/2016 | Burhanidust | | D12/223 |
| 9,416,992 B2* | 8/2016 | Braunstein | | F16B 5/0685 |
| 9,431,953 B2* | 8/2016 | Stearns | | H02S 20/23 |
| 9,473,066 B2* | 10/2016 | Stephan | | H02S 20/23 |
| 9,793,852 B2* | 10/2017 | Almy | | H02S 20/23 |
| 9,800,199 B2* | 10/2017 | Meine | | H02S 20/23 |
| 9,850,661 B2* | 12/2017 | Kovacs | | E04D 13/10 |
| 9,853,593 B2* | 12/2017 | Cinnamon | | H02S 20/23 |
| 9,973,142 B2* | 5/2018 | Stearns | | H02S 40/12 |
| 9,985,575 B2* | 5/2018 | Stearns | | F24S 25/60 |
| 10,097,133 B2* | 10/2018 | Aliabadi | | H02S 20/23 |
| D835,980 S* | 12/2018 | Kovacs | | D8/499 |
| 10,158,321 B2* | 12/2018 | Guthrie | | H02S 20/23 |
| 10,187,006 B2* | 1/2019 | Almy | | H02S 20/23 |
| 10,469,022 B2* | 11/2019 | Kovacs | | F24S 25/35 |
| 10,511,251 B2* | 12/2019 | Kobayashi | | H02S 20/23 |
| 2010/0276558 A1* | 11/2010 | Faust | | F24S 25/12 |
| | | | | 248/222.14 |
| 2011/0000519 A1* | 1/2011 | West | | F24S 25/67 |
| | | | | 136/244 |
| 2013/0074441 A1* | 3/2013 | Stearns | | E04D 13/10 |
| | | | | 52/705 |
| 2013/0145711 A1* | 6/2013 | Haddock | | F24S 25/615 |
| | | | | 52/478 |
| 2013/0168525 A1* | 7/2013 | Haddock | | E04D 3/365 |
| | | | | 248/505 |
| 2013/0340358 A1* | 12/2013 | Danning | | H02S 20/23 |
| | | | | 52/126.7 |
| 2016/0126884 A1* | 5/2016 | Stearns | | F24S 25/636 |
| | | | | 52/173.3 |
| 2016/0177984 A1* | 6/2016 | Kovacs | | B25B 5/101 |
| | | | | 361/825 |
| 2016/0308486 A1* | 10/2016 | Atia | | F24S 25/636 |

* cited by examiner

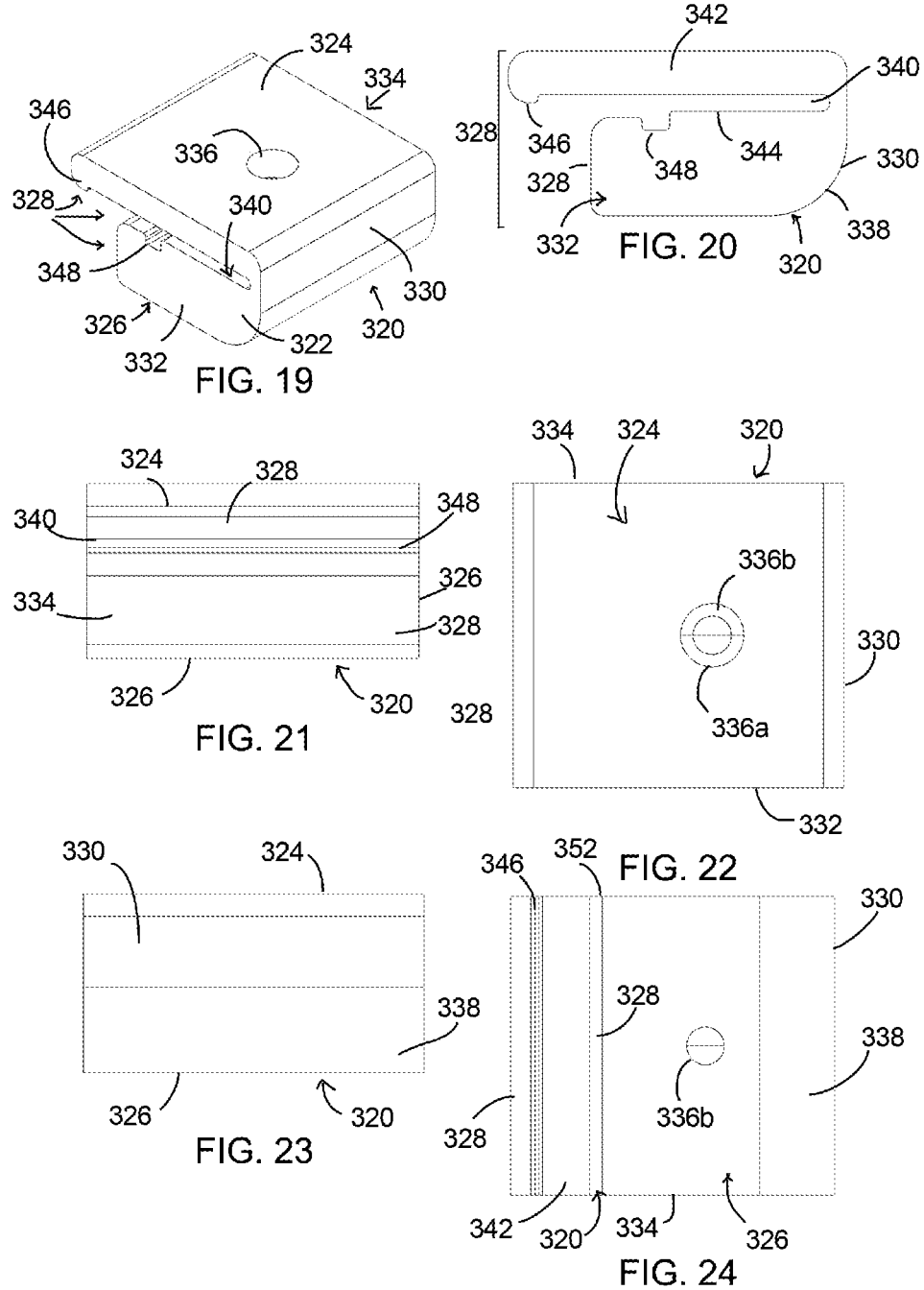

RETENTION APPARATUS, SYSTEM AND METHOD

CROSS-REFERENCE TO RELATED APPLICATION

This application is a continuation in part of pending U.S. patent application Ser. No. 15/254,892 filed Sep. 1, 2016 entitled "Retention Apparatus, System and Method" that claims the benefit of U.S. Provisional Application No. 62/218,567, filed Sep. 14, 2015 entitled "Wire Management Clip For Mounting Clamp For A Metal Roof Seam," and of U.S. Provisional Application No. 62/219,657, filed Sep. 16, 2015 entitled "Color Snap Snow Rail Assembly, System And Method," and that claims the benefit of U.S. Provisional Application No. 62/461,780 filed Feb. 21, 2017 entitled "Clamp Mounting Assembly," which are incorporated in their entirety herein.

FIELD OF THE INVENTION

The present invention relates to retention systems and, more particularly, for a solar panel connector assembly and mount assembly for an apparatus, system and method for mounting a solar panel while retaining snow, ice, items and other objects on a wall, rooftop and other structure using cross member having an anchor assembly configured to join to a latch assembly of top block to a clamp assembly of a metal roof and/or a stanchion assembly for a membrane roof on a wall, rooftop and other structure.

BACKGROUND OF THE INVENTION

Conventional assemblies and methods for snow and/or ice retention systems use a mounting system for mounting to a wall, roof or other structure to restrain from falling such as, for example, snow, ice, or other items and/or objects. The mounting system is adapted to mount thereto a cross-bar, rod, stop, decorative insert, snow break, or other member typically oriented parallel to the peak or otherwise transverse to the snow, ice or other objects. Additionally, conventional mounting systems do not provide an apparatus system and/or method for mounting a solar panel while providing a snow retention as these require an additional racking system, numerous parts and assemblies that add cost to the manufacture and installation. Additionally, conventional mounting systems do not provide an apparatus system and/or method systems for mounting a solar panel on a membrane roof while providing a snow retention as these require an additional racking system, numerous parts and assemblies that add cost to the manufacture and installation. Consequently, conventional assemblies are costly to manufacture as well as installation time is increased because of the assembly required on-site that adds time on the roof for the installer and overall costs for the installation.

SUMMARY OF THE INVENTION

It is an object of the apparatus system and/or method to provide a clamp connector for mounting a solar panel to a snow retention apparatus and system that overcome the disadvantages of conventional retention systems to satisfy a long felt need for a simple and effective means to provide snow retention for solar panel installations on a wall, roof or other structure.

It is an object of the present invention to provide a clamp connector for mounting a solar panel to a snow retention apparatus and system to a structure such as (1) a standing seam of a metal roof and/or (2) a membrane roof having less components, direct approach transverse method of interconnecting, and improved installation.

It is an object of the present invention to provide a stanchion assembly having a body with an opening for receiving a post of a flashing and/or membrane roofing pad to attach to the structure. The stanchion assembly has a notch and second opening in the body for receiving the top block and fastener to connect the cross member to the stanchion assembly to attach to the structure having a membrane roof. Alternatively, a fastener can secure the top block, cross member and the clamp assembly to the standing seam of a metal roof. In each case, the top block is configured to be joined to the clamp assembly and/or stanchion assembly by the fastener having an flange located adjacent a side of the clamp body and/or notch of the stanchion assembly configured to allow rotation of the top block and a latch assembly located on a side of the top block opposite the flange adapted to receive an anchor assembly of a cross member assembly and join the latch and anchor assemblies to operably connect the cross member to the clamp assembly secured to the structure.

It is an object of the present invention to provide cross member assembly including a coupler channel configured to operably connect a clamp connector for mounting a solar panel to a snow retention apparatus and system, to operably connect an ice flag and/or to operably connect sections of cross member(s) using a connector in the coupler channel.

It is an object of the present invention to provide cross member assembly a clamp stand-off surface on an end an arm extension of the cross member abuts a side of the clamp body and/or the stanchion assembly whereby securing said anchor assembly and said latch assembly to the top block with the clamp body and/or with the stanchion assembly provides a force for opposing forces applied by snow, ice or other objects to one or more of the cross member and/or ice flag.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Description of the Embodiments, which is to be read in association with the accompanying drawings, which are incorporated in and constitute a part of this specification, show certain aspects of the subject matter disclosed herein and, together with the description, help explain some of the principles associated with the disclosed implementations, wherein:

FIG. 19 is a top perspective view illustrating a clamp connector in accordance with an embodiment of the present invention;

FIG. 20 is a side view illustrating a clamp connector thereof;

FIG. 21 is a front view illustrating a clamp connector thereof;

FIG. 22 is a top view illustrating a clamp connector thereof;

FIG. 23 is a rear view illustrating a clamp connector thereof;

FIG. 24 is a bottom view illustrating a clamp connector thereof;

DESCRIPTION OF THE EMBODIMENTS

Figure 1:
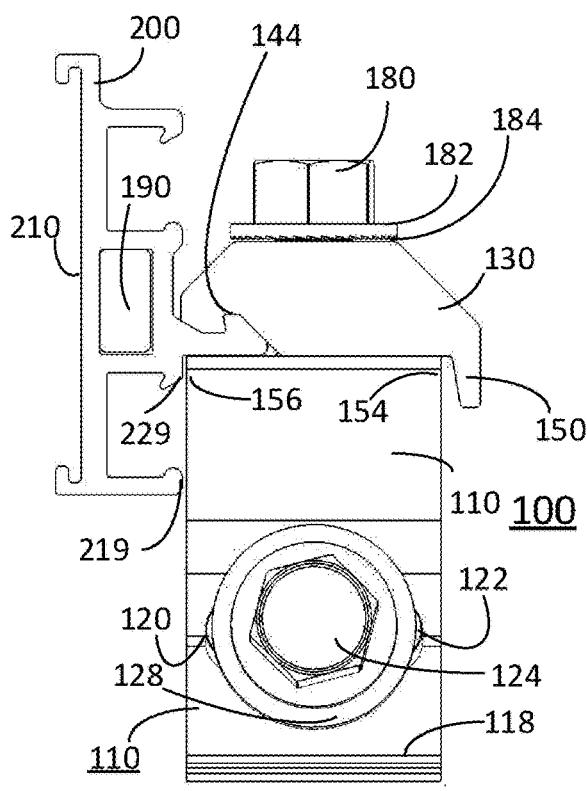
FIG. 1 is a side view illustrating the retention assembly, system and method in accordance with an embodiment of the present invention.

Non-limiting embodiments of the present invention will be described below with reference to the accompanying drawings, wherein like reference numerals represent like elements throughout. While the invention has been described in detail with respect to the preferred embodiments thereof, it will be appreciated that upon reading and understanding of the foregoing, certain variations to the preferred embodiments will become apparent, which variations are nonetheless within the spirit and scope of the invention.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "some embodiments", "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are provided for the purposes of illustrating some embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein the term "concrete roofing" refers to concrete or fibre cement, usually reinforced with fibres of some sort that may be uniform or formed of concrete tiles.

As used herein the term "metal roofing" refers to Corrugated galvanized iron (e.g. Gal iron or Corro made from steel with longer-lasting, coloured, alloy coatings), Copper roofs, Standing-seam metal with concealed fasteners, Mechanically seamed metal with concealed fasteners, Flatseam metal with or without soldered seams, Steel coated with a coloured alloy of zinc and aluminum, and Stone-coated metal roofing.

As used herein the term "shingle" refers to the generic term for a roofing material that is in many overlapping sections, regardless of the nature of the material including: Asbestos, Asphalt, Shake, Slate, Wood, ceramic tile, Metal, Rubber, and Solar Shakes or Shingles.

As used herein the term "mount" refers to an object to which another is affixed or on which another is placed for accessibility, display, or use. Nonlimiting examples of the term "mount" may include a mounting assembly such as a clamp assembly 110, mounting assembly 400, or a stanchion assembly 410, but may refer to other embodiments as well. The term "mount" also is not limited by the nature of the roofing construction; for example, such roofing construction may include, but is not limited to: concrete roofing, metal roofing, shingle roofing, tile roofing, or membrane roofing.

As used herein the term "tile" refers to the generic term for a roofing material that is in many adjacent sections, regardless of the nature of the material and may include a waterproof glaze. Tiles are designed mainly to keep out rain, and are traditionally made from locally available materials such as ceramics, clay, concrete, plastic, terracotta or slate.

As used herein the term "membrane roofing" refers to large sheets of a membrane or substrate, generally fused in some way at the joints to form a continuous surface on the structure including: Vinyl roof membrane, Thermoset membranes (e.g. synthetic rubber, EPDM rubber—Synthetic rubber sheets adhered together with contact adhesive or tape with application is large open areas of a roof, e.g. large mall structure), Thermoplastics (e.g. PVC, TPO, CSPE)—Plastic sheets welded together with hot air, creating one continuous sheet membrane that may be re-welded with the exception of CSPE, Liquid Roofing, Asphalt roll roofing, Bituminous waterproofing, Fabric, Polyester, and PTFE, (synthetic fluoropolymer) embedded in fiberglass.

Figure 3:
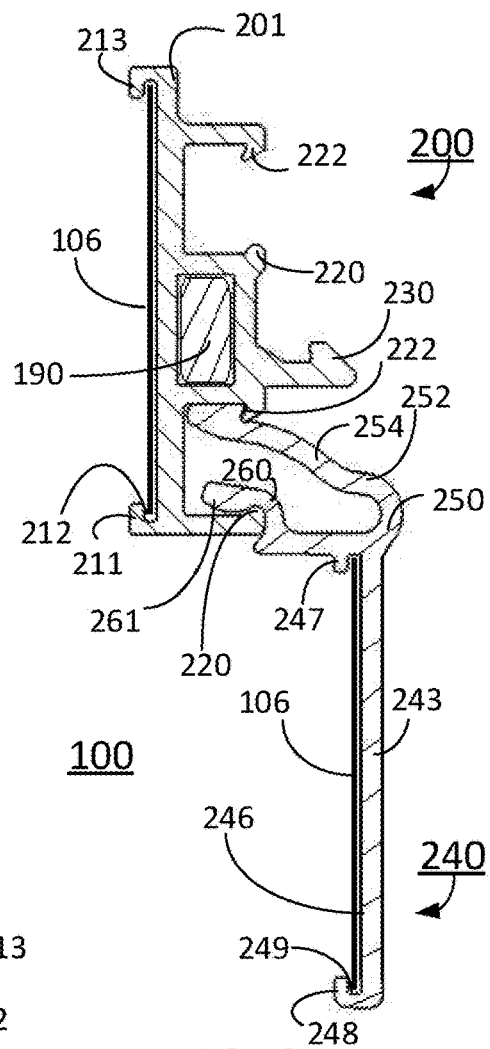
FIG. 3 is a side cross-sectional view, taken along lines B-B of FIG. 6B, illustrating the ice flag and cross member assemblies of the apparatus, system and method in accordance with an embodiment of the present invention.
Figure 4:
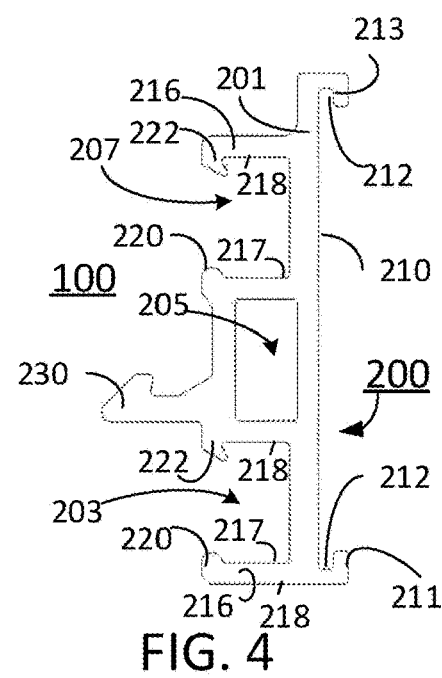
FIG. 4 is an end view illustrating the cross member assembly of the apparatus, system and method in accordance with an embodiment of the present invention.
Figure 5A:
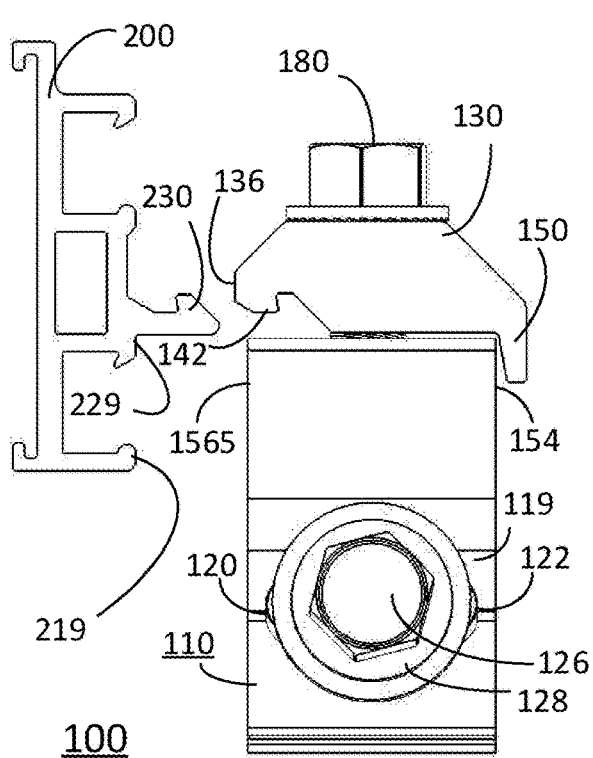
FIGS. 5A, 5B, 5C, and 5D are side views illustrating the operation of operable connection between the top block, clamp assembly and cross member assembly in accordance with an embodiment of the present invention.
Figure 5B:
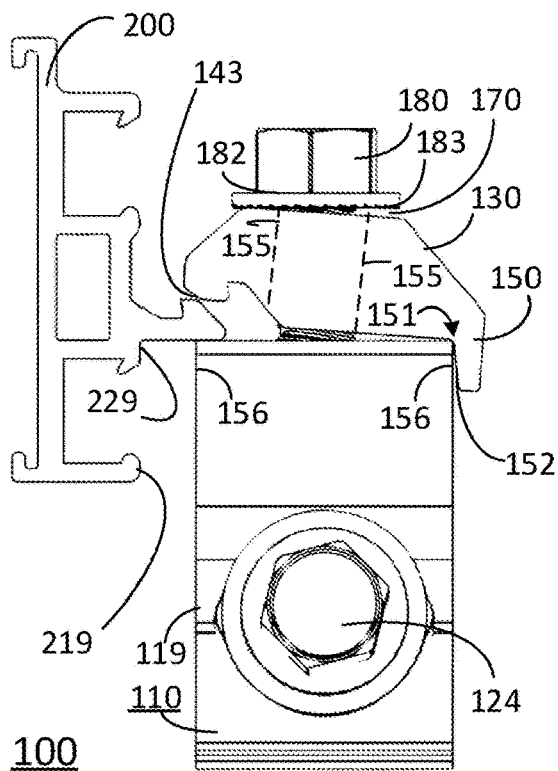
Figure 5C:
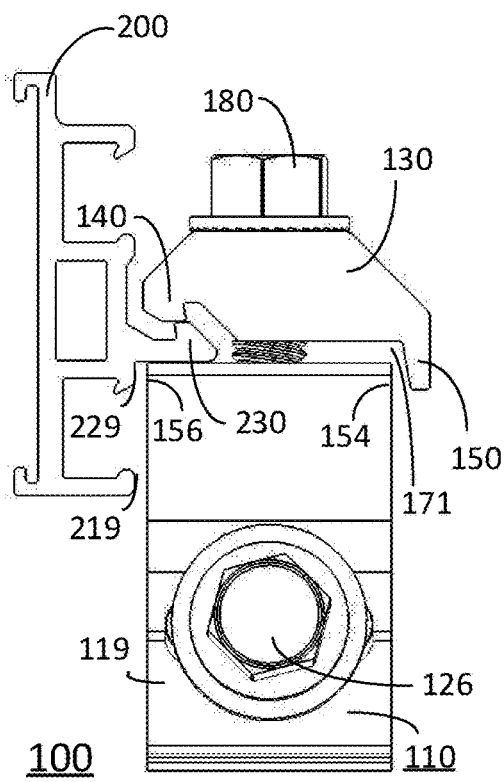
Figure 5D:
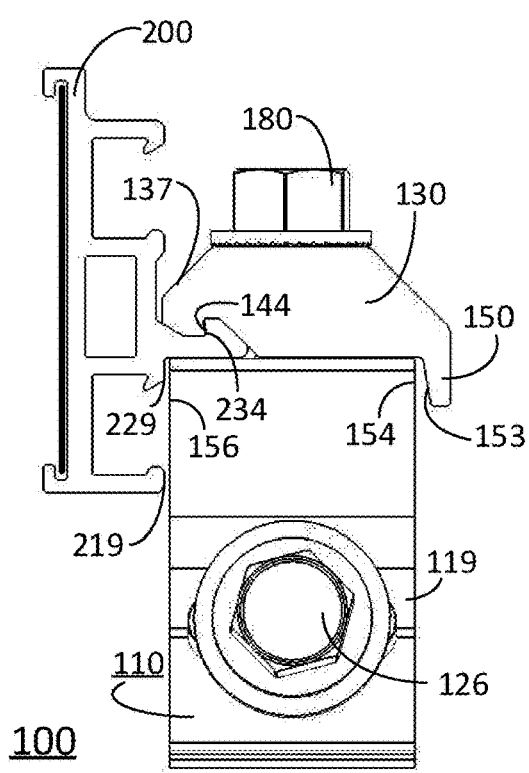
Figure 6A:
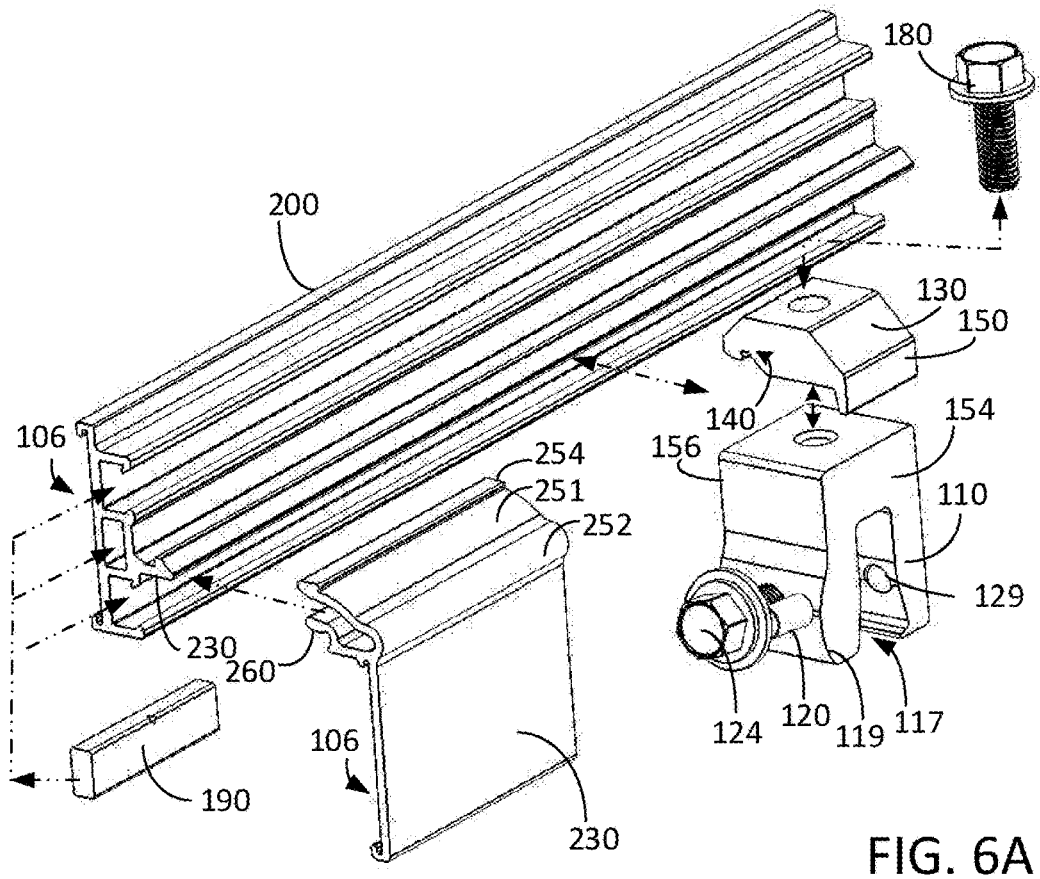
FIG. 6A is an exploded perspective view of a retention system.
Figure 6B:
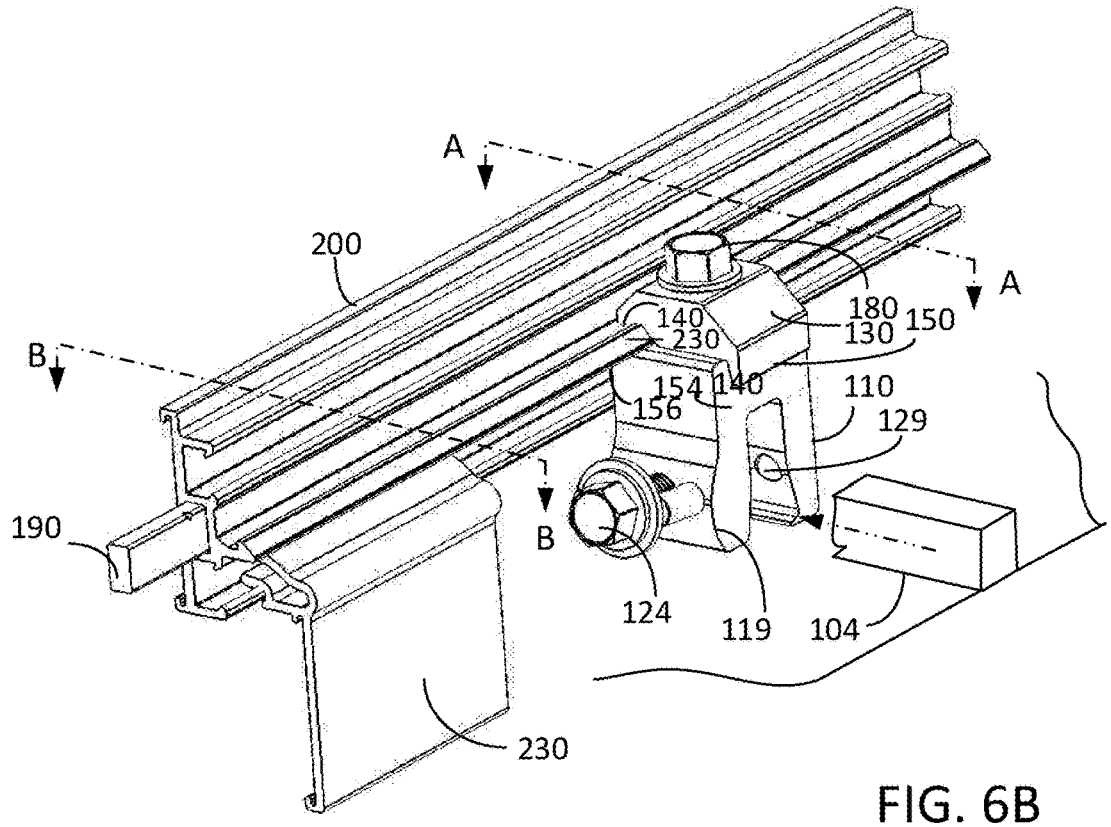
FIG. 6B is an assembled perspective view illustrating retention system according to an embodiment of the apparatus, system and method of the present invention.

As is illustrated in FIGS. 1 through 12A-12B, retention apparatus system and method is generally shown as element 100 is useful to attach to a standing seam 102 of a metal roof 104 as well as to display outwardly a portion of the metal roof 106 for decorative purposes as desired, as illustrated in FIGS. 3, 5D and 6B. The apparatus system and method 100 comprises may be configured as a clamp assembly 110, top block 130 secured by a fastener 180 to the clamp assembly 110, and a cross member assembly 200 configured with an anchor assembly 230 to operably connect by a 90° approach to a latch assembly 140 formed in the top block 130, and a snow and/or ice flag 240 configured to operably connect to the cross member assembly 160. Two or more cross members 200 of the retention apparatus, system and method 100 may be joined together by a connector 190 so as to extend across a desired length of the metal roof 104. Moreover, the cross member assembly 200 may be formed in various dimensions, for example, a thin accent formed by two segments 202 and 204, that is scalable to various widths by adding additional segments (e.g. three by adding segment 206, four by adding segment 208, . . . , n) to the extruded cross member body 201 as described herein. According to an embodiment of the present invention, the retention apparatus, system and method 100 is described as a modular assembly using a minimum number of components to operably connect to a seam 102 of a metal roof 104 to retain snow and/or function as a snow break. The retention apparatus, system and method 100 also may formed and utilized without the portion of the metal roof 106. As will be appreciated by one skilled in the art, the apparatus system and method 100 may find further used for mounting other items and things to a structure such as a wall, building or rooftop, shingled roof, and structures other than a metal roof.

Referring to FIGS. 1-2, 5A-5D, 6A-6B, 7A-7B, 8 and 12A and 12B, the top block 130 may be formed from a block body 132 configured with a pair of sides 131, 133, an upper surface 134 and a lower surface 139 having a generally planar segments to secure the fastener 180 and mounted on the clamp assembly 110, respectively, and a latch assembly 140. The fastener 180 is configured to be received in a guide shaft 155 (e.g. a bore or an opening) extending between the upper and lower surfaces 134, 139 with a suitable dimension to provide rotational movement when operably connecting cross member assembly 200 to the top block 130 and clamp assembly 110, as illustrated in FIG. 5B as well as generally FIGS. 5A-5D and 6A-6B. The block body 132 be formed from suitable materials that are durable, resist corrosion, maintain strength at high temperatures, and are easy to maintain such as, for example, 6063-T6 and/or 6061-T 6 aluminum alloy (e.g. containing magnesium and silicon as its major alloying elements), stainless steel alloys, plastics and carbon fiber products. The top block 130 may be formed in a dimension of 1.25 inches long, which dimension is non-limiting and as top block may be scaled as desired. The upper surface 134 may be formed with a tail 135 having an integral flange 150 with a pivot 151 and a rotation surface 152 formed at an angle for a rotation bevel 153 located adjacent the clamp assembly 110 functioning to provide movement when operably connecting the cross member 200 to the clamp assembly 110 and top block 130. The upper surface 134 may be formed at an angle with a tail bevel 135 to remove excess material from the top block 130 so as to save material costs and to create a lighter component advantageously useful during the labor and installation of the retention apparatus, system and method 100 while operating on a metal roof 104 or other structure. The upper surface 136 may be configured with a tong nose 136 and tong nose bevel 137 formed at an angle so as to provide clearance with the cross member 200 when connecting with the latch assembly 140.

Referring to FIGS. 1, 2, 5A-5D, 6A-6B, and 12A-12B, the top block 130 may be configured with a latch assembly 140 formed between the upper surface 134 and the lower surface 139 so as to operably connect to the cross member assembly 200 by direct connection by placing crosswise, at right angles to the long axis of the cross member 200 by inserting the cross member 200 in a transverse approach to the latch assembly 140 the top block 130. The latch assembly 140 comprises a lip 142, a hook 144, a recess 146 and an anchor 148 to secure and hold the cross member 200 by the applied force imparted on the top block 130 by the fastener 180. The latch assembly 140 may be formed by milling such as, for example, computer numeric controlled (CNC) machining to mill an entry lip bevel 143 formed at an angle to the lip 142, whereby the entry lip bevel 143 functions to allow lifting of the top block 130 when the anchor assembly 230 is positioned for entry to the top block 130. The tip surface 141 may be formed in a vertical axis dimension or may be part of the original extrusion or block of material. The entry lip bevel 143 functions to rotate top block 130 having the fastener 180 secured to the clamp assembly 110. The entry lip bevel 143 may be formed at an angle of approximately between thirty degrees (30°) and forty-five degrees (45°), which is non-limiting angular dimension, according to an embodiment of the present invention. The latch assembly 140 also may be formed with a hook bevel 145 formed at an angle joining the lip 142 to the hook 144 and recess 146 by CNC milling manufacturing techniques. The hook bevel 145 functions to latch and hold the cross member 200 after entry and transitioning of the lip 142 by the anchor assembly 230. The hook bevel 143 may be formed at an angle of approximately ten degrees (10°), which is a non-limiting angular dimension, according to an embodiment of the present invention. The body anchor 148 may be formed with a body anchor bevel 149 formed at an angle and functioning to transfer the applied forces of the fastener 180 to anchor assembly 230 so as to secure and hold the cross member 200 to the top block 130. The body anchor bevel 149 may be formed at an angle of approximately forty-five degrees (45°), which is non-limiting angular dimension, according to an embodiment of the present invention. Additionally, the guide shaft 155 is configured with a portion extending into the body anchor 148 and body anchor bevel 149 so as to allow rotation of the top block 130 in cooperation with the entry lip bevel 143 when the anchor assembly 230 is positioned for entry to the top block 130 thereby functioning to allow lifting of the top block 130 and transitioning of the lip 142 by the anchor assembly 230 to latch and hold the cross member 200. According to an embodiment of the present invention, each top block 130 surface of the lip 142, entry lip bevel 143, hook 144, hook bevel 145, recess 146, anchor 148 and anchor bevel 149 are configured or otherwise formed at an angles suitable to conform to the joining section(s) on the anchor assembly 230 of the cross member assembly 200.

Figure 2:
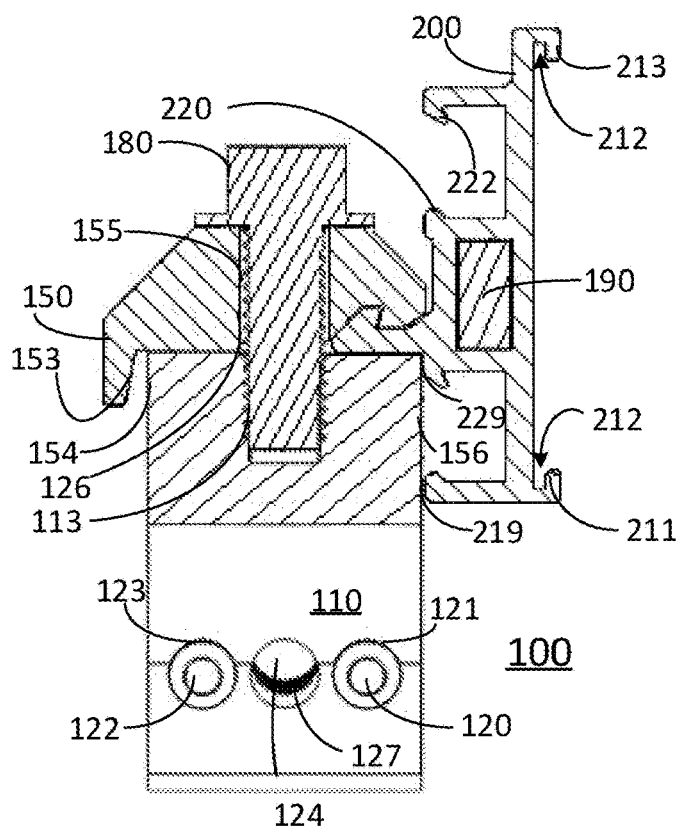
FIG. 2 is a side cross-sectional view, taken along lines A-A of FIG. 6A, illustrating the top block and clamp assembly of the apparatus, system and method in accordance with an embodiment of the present invention.
Figure 7A:
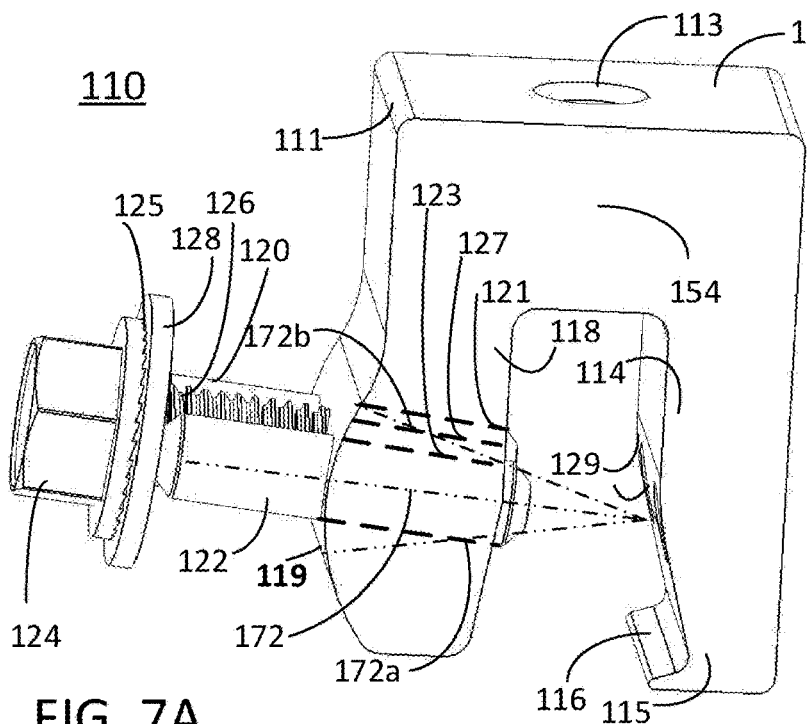
FIG. 7A is a side perspective view illustrating a clamp assembly of the present invention.
Figure 7B:
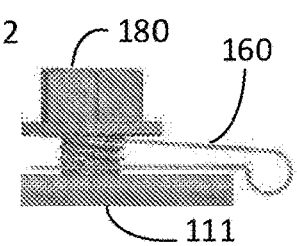
FIG. 7B is a side view illustrating a leaf spring adapted to bias the top block toward the clamp assembly in accordance with another embodiment of the present invention.
Figure 7C:
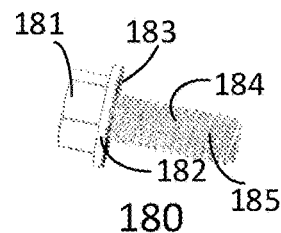
FIG. 7C is a side perspective view illustrating a fastener used in accordance with embodiments of the present invention.
Figure 8:
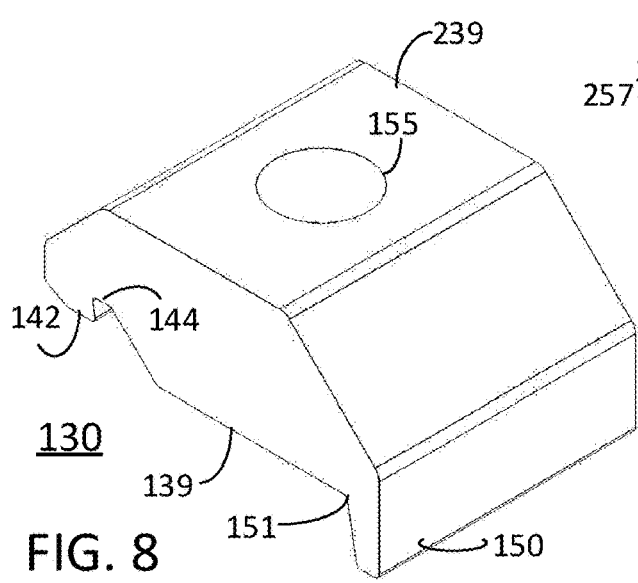
FIG. 8 is a side perspective view illustrating a top block of the apparatus, system and method in accordance with an embodiment of the present invention.
Figure 11:
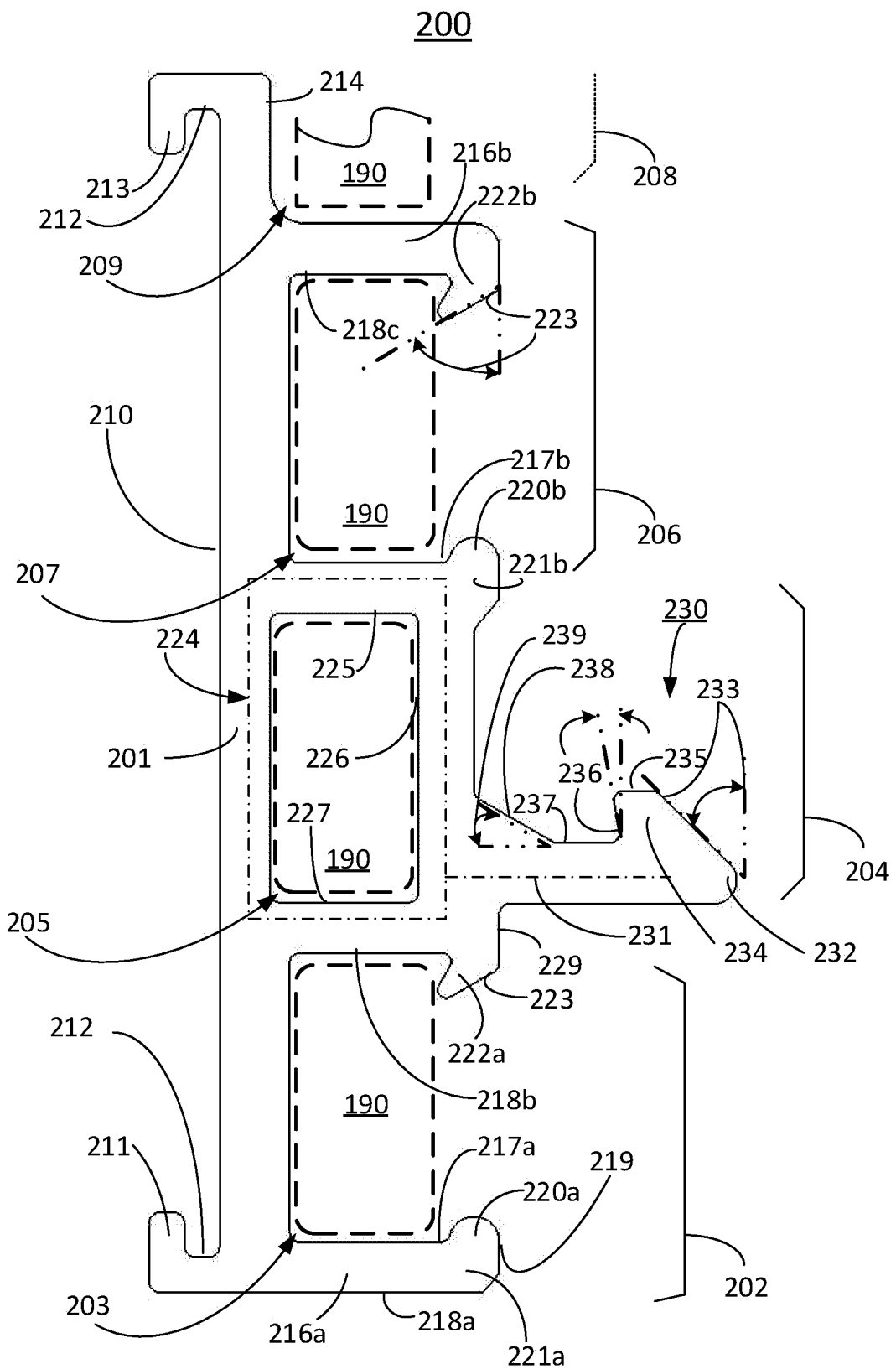
FIG. 11 is a side view illustrating a cross member of the apparatus, system and method of the present invention.
Figure 12A:
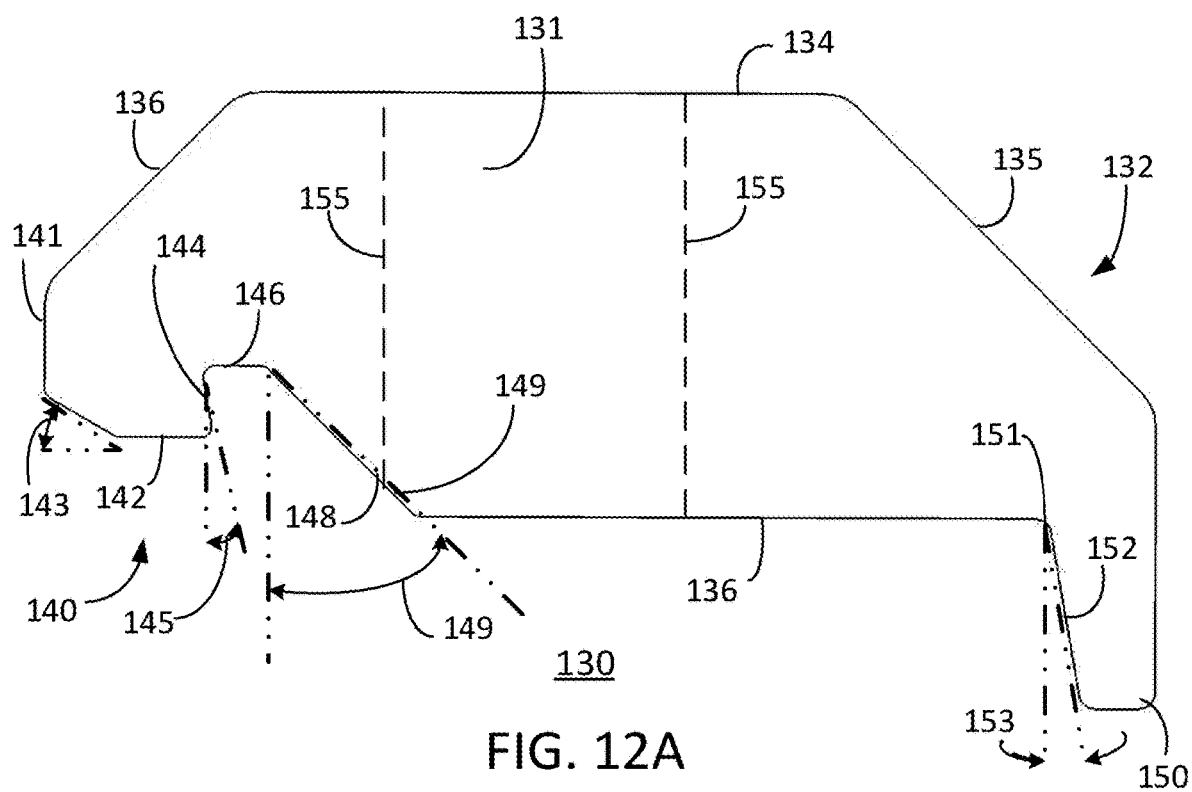
FIGS. 12A and 12B are side and top views illustrating a top block of the apparatus, system and method in accordance with an embodiment of the present invention.
Figure 12B:
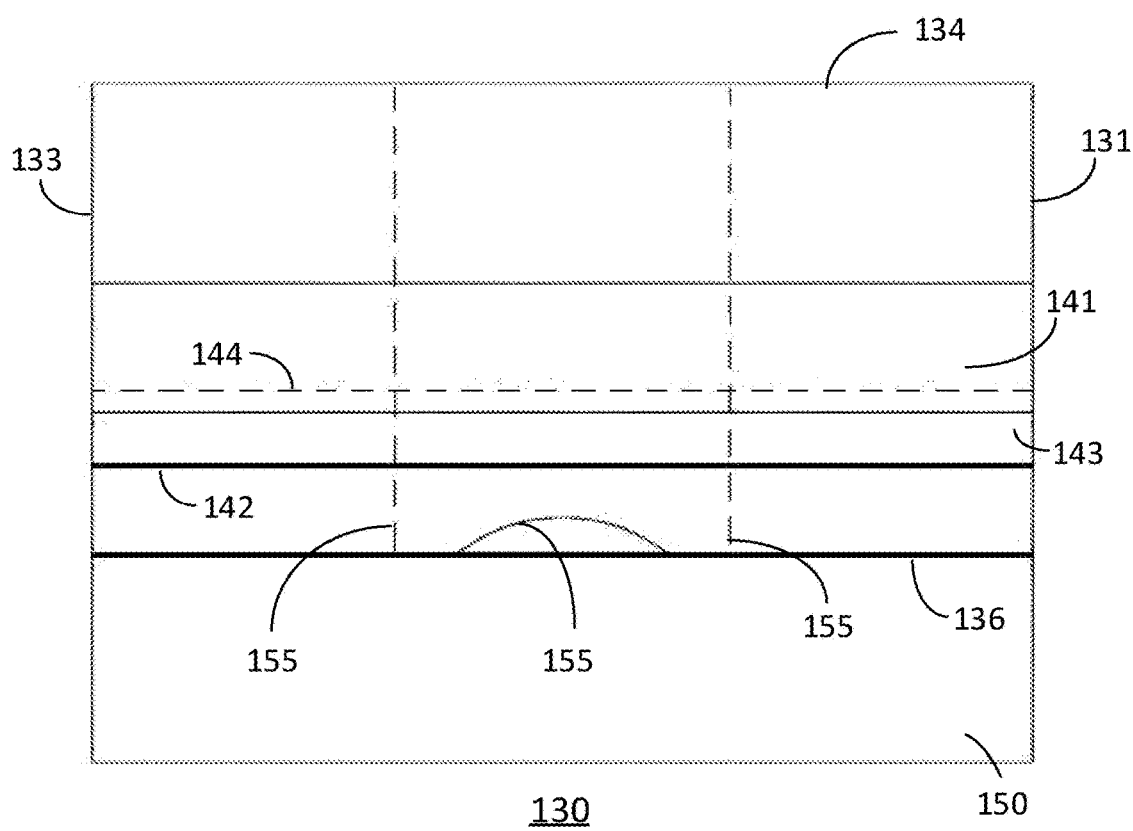

Referring to FIGS. 1, 2, 5A-5D, 6A-6B and 11, the block body 130 can be configured with a flange 150 on one end. The flange 150 functions to rotate the top block 130 around pivot 151 so as to allow the block body 131 to open and receive the anchor assembly 230 as shown in FIG. 5B. The flange 150 further functions to arrange and orient the top block 130 on the upper surface 134 of the clamp assembly 110 so as to align opening of the guide shaft 155 with an attachment shaft 113 of the clamp assembly 110 as shown in FIG. 5C. For example, the fastener 180 may be inserted through the opening of the guide shaft 155 to the attachment shaft 113 in the upper surface 112 of the clamp assembly 110 shown in FIGS. 2, 5A-5D, 6A-6B and 7A. The fastener 180 may be tightened and loosened by the threads, for example, turning clockwise and counter-clock-wise so as to operably connect the top block 130 to the clamp assembly 110 as shown in FIGS. 1 and 2. The flange 150 may be configured with a clamp rotation surface 152 in a suitable rotation flange bevel 153 formed at an angle so as to provide clearance in allowing pivoting of the top block 130 at pivot 151 for insertion of the anchor assembly 240 as shown in FIGS. 7B, 7C and 11. The flange 150 further provides a predetermined distance as registered on the pivot 151 on a side 154 of clamp assembly 110 to the edge of the clamp stand-off surface 229 on the cross member assembly 200 so as to provide a stable structure for the operable connection as shown in FIGS. 1, 2, 5A-5D, and 7, although one skilled in the field will understand that either side 154 or 156 may be utilized by the flange depending upon orientation of the clamp assembly 110 on the standing seam 102 as shown.

In operation, the flange 150 is configured to provide rotation and orientation and to register the load of any ice or snow supported to the clamp stand-off surfaces 219 and 229 of the cross member 220 thereby directed these applied forces to the clamp assembly 110 secured to the seam 102 of the metal roof 104 as shown in FIG. 6B. Accordingly, the arm 216a is configured for multiple use to provide structural support, holding, maintaining, and preventing rotation by (1) the clamp stand-off surface 219 against a side 156 of the body 111 of the clamp assembly 110 when snow, ice or other object forces are applied to one or more of the cross member 200 and ice flag 240, and (2) the nub projection 220, with support of the clamp-off surface 219, of the arm 216a extension provides holding of the ice flag 240 so as to resist deflecting, collapse and/or disengagement from coupler channel 203 of the cross member 200 when snow, ice or other object forces are applied to the ice flag 240. Similarly, the anchor arm extension 224 is configured for multiple use to provide structural support, holding, and preventing rotation by (1) the clamp stand-off surface 229 against a side 156 of the body 111 of the clamp assembly 110 when snow, ice or other object forces are applied to one or more of the cross member 200 and ice flag 240, and (2) the hook portion 222a provides holding of the ice flag 240 so as to resist deflecting, collapse and/or disengagement from the cross member 220, whereby the coupler channel 203 allows for securing an ice flag 240, a connector 190, or both. The arm 216b extension is configured with hook portion 222b for holding of the ice flag 240 in the coupler channel 207 so as to resist deflecting, collapse and/or disengagement from the cross member 220 when snow, ice or other object forces are applied to the ice flag 240, whereby coupler channel 207 provides for securing an ice flag 240, a connector 190, or both. Similarly, the nub 220b on end 221b of the anchor arm extension 224 adjacent upper surface 217b is configured to provide structural support, holding, and preventing rotation the ice flag 240 in the coupler channel 207 so as to resist deflecting, collapse and/or disengagement from the cross member 220 when snow, ice or other object forces are applied to the ice flag 240, whereby the coupler channel 207 allows for securing an ice flag 240, a connector 190, or both.

Referring to FIGS. 14, 5A-5D, 6A-6B, and 11, the cross member assembly 200 comprises a body 201 having 2 or more segments 202, 204 and 206 with integral coupler channels 203, 205 and 206 for affixing thereto the connector 190 and a snow or ice flag 240 is described. The body 201 may be formed from metal extrusion in elongated sections from suitable metals and/or alloys used in the production of extrusions including long constant cross-section structural shapes produced by pushing metal through a shaped die such as, for example, 6061-T6 and/or 6063-T6 aluminum alloy. The cross member assembly 200 extrusion may be configured with a front surface 210 and a back surface 214. The front surface 210 may be formed with a tab 211 and a tab 213 disposed on each edge thereby forming a channel 212 configured to receive a decorative portion of the metal roof 106. According to the exemplary embodiment of the present invention, the cross member 200 is configured to accept a decorative, matching section of metal roof 106 disposed slidably into a channel 212 on a facing, front surface 212 of the cross member 200. The cross member 200 is configured to accept a decorative, matching section of metal roof placed into a channel 212 on a facing, front surface of a cross-member. The cross member is configured to accept an ice flag 240 mountable to a back surface 214 of the cross member 200 using an integral tong portion 251 cooperating with one or more coupler channels 203 and 207 formed in segments 202 and 226 of the cross member 200. The ice flag 240 also includes a surface or forward face 246 having a channel 249 configured to accept insertion of a decorative, matching section of metal roof 106 disposed into the channel 249 to display a similar appearance with the decorative, matching section of metal roof 106 disposed into a channel 212 on a facing, front surface 210 of the cross member 200, as shown in FIGS. 3 and 6B. Consequently, the cross member 200 along with one or more ice flags 240 advantageously may be located or assigned to a particular place along the metal roof 104, at different heights above the metal roof by the selection of the coupler channel 203 or 207, as desired to retain snow and ice from sliding off thereby preventing a hazardous condition.

As is illustrated more particularly in FIGS. 3, 4 and 11, the cross member assembly 200 may be configured with one or more extensions 216 connected to and projecting from the body 201 on the back surface 214 according to an embodiment of the present invention. The arm extension 216 extends generally transversely from the body portion 201 configured with an upper surface 217, a lower surface 218, and a clamp stand-off surface 219 on an end 221 of the arm extension 216. The end 221 of the arm extension 216 may be formed with a protuberance projection or nub 220 as well as a locking projection 222 configured or otherwise formed at an angle to secure and hold a connector 190 and the ice flag 240 in the coupler channel 203. For example, referring to segment 202, the arm extension 216a is configured with upper surface 217a, a lower surface 218a, Similarly, referring to segment 206, the arm extension 216b is configured with a lower surface 218b having the locking projection 222 and an upper surface 217b having a nub 220 on an end 221b thereof to secure and hold a connector 190 and/or the ice flag 240 in the coupler channel 207. It should be appreciated that the number of segments of the cross member assembly 200 is scalable and may be formed, for example, from two segments 202 and 204 in a short, thin design, or in a wider, taller design formed from multiple segments 202, 204, 206, 208, . . . , n for a desired appearance for the metal roof 104 by the addition of an arm extension 216 with a locking projection 222 and a nub 220 to secure and hold a connector 190 and/or the ice flag 240 in the coupler channel 207 as shown in FIGS. 3 and 4.

Referring to FIG. 11, the cross member assembly 200 may be configured with a segment 204 having an anchor arm extension 224 and an anchor assembly 230. The anchor arm extension 224 may be formed with portion 225 and portion 227 extending from the body 210 with portions 225 and 227 connecting to a cross-bar portion 226 so as to give a particular shape to the coupler channel 205 so as to secure and hold a connector 190. The anchor assembly 230 may be configured as an extension 231 connecting to the cross-bar portion 226 and extending generally transverse therefrom. The extension 231 may be formed with a clamp stand-off surface 229 on lower surface adjacent the locking projection 222 of segment 202 connecting to the locking projection 222 by an ice flag locking bevel 223. The extension 231 may be formed with a locking a protrusion 232 at an end thereof and a hook portion 234. The protrusion 232 and hook portion 234 may be configured to join the tip 232 to the cross-bar portion 226 by the a lip entry surface 233, recess joining surface 235, a hook bevel surface 236, a lip mating surface 237, a lip bevel mating surface 238 along an upper surface of the extension 231. The lip entry surface 233 may be formed at an angle to allow entry of the protrusion 232 to the top block 130 and suitable to join with the angle of the entry lip bevel 143, for example, an angle approximately between thirty degrees (30°) and forty-five degrees (45°), which is non-limiting angular dimension, according to an embodiment of the present invention. The hook bevel surface 236 may be formed at an angle suitable to join with the hook bevel 145 of the top block 130, for example, at an angle of approximately ten degrees (10°), which is a non-limiting angular dimension, according to an embodiment of the present invention. The lip bevel mating surface 238 may be formed at an angle suitable to join with the angle of the entry lip bevel 143 of the top block 130, for example, at an angle of approximately forty-five degrees (45°), which is non-limiting angular dimension, according to an embodiment of the present invention.

In operation, as illustrated in FIGS. 2, 3, 6A and 6B, the cross member 200 along with one or more ice flags 240 advantageously may be assigned to a particular place or position along the metal roof 104, at different heights above the metal roof by the selection of the coupler channel 203 or 207, as desired to snow and ice from sliding off thereby preventing a hazardous condition. The applied force and load of any ice or snow is supported by the structure of the hook 144 of the top block 130 and hook portion 234 of the anchor assembly 240. In addition, the joined surfaces of the top block 130, for example, the surface of the lip 142, entry lip bevel 143, hook 144, hook bevel 145, recess 146, anchor 148 and anchor bevel 149 are configured to conform to the joining section on the anchor assembly 230 of the cross member assembly 200. Principally, the joined surfaces of the top block 130 are joined to the adjacent surfaces of the tip 232 to the cross-bar portion 226 by the a lip entry surface 233, recess joining surface 235, a hook bevel surface 236, a lip mating surface 237, a lip bevel mating surface 238 along an upper surface of the extension 231. Consequently, the cross-member 200 is configured with the anchor assembly 230 advantageously forming a snap connection with the top block 130 and clamp assembly 200 (e.g. fastener 180, top block 130 and latch assembly 140) by inserting thereto (i.e. snap in place to the clamp assembly 110 and top block 130) in a direct contact, transverse approach, or alternatively securing the fastener 180 through spring and/or leaf spring 160 and guide shaft 155 of the top block 130, and to clamp assembly 110 (e.g. an A2® clamp or A2-N™ clamp).

As illustrated in FIGS. 3, 6A-6B, and 10, an ice flag 240 of the retention apparatus, system and method 100 can be configured with a body 241 having a lower segment 242 and an upper segment 250. The body 241 of the ice flag 240 may be formed from metal extrusion in elongated sections from suitable metals and/or alloys in the production of extrusions including long constant cross-section structural shapes produced by pushing metal through a shaped die such as, for example, 6061-T6 and/or 6063-T6 aluminum alloy. The body 241 may be cut to dimensions such as, for example, approximately 3 inch or 8 cm sections, which dimension is non-limiting, easily disposed between standing seams 102 of the metal roof 104 operating to retain snow and ice from slipping off the metal roof 104. The lower segment 242 includes a rear face 244 operable to retain and apply a pressure force against snow and ice accumulation between the standing seams 102 on the metal roof 104. The lower segment or to further includes a forward face 246 configured with tabs 247 and 248 forming a channel 249 for insertion of a decorative portion of the metal roof 106 that may be displayed facing an observer from the ground. The installed cross-member 200 and ice flag 240 may each receive a decorative portion of the metal roof 106 in the channel so as to match the color of the metal roof 104 and form an appealing decorative appearance.

As illustrated in FIGS. 3, 6A-6B, 10 and 11, the upper segment 250 of the ice flag 240 can be configured with a tong portion 251 extending from a hinge spring portion 252 operably connected to the body 241 and lower segment 242. The tong portion 251 has an upper arm 254 and a lower arm 260 extending from the hinge spring portion 252. The upper arm 254 may be configured with a tongue end 255 having an upper surface 256 that may be formed as a continuous surface that is relatively smooth, a forward end 257 on a distal end of the upper surface 256 and a tooth 258 on a proximal end of the upper surface 256. The upper surface 256 is may be configured to engage and register against the upper surface 218 (e.g. 218a of coupler channel 203 shown in FIG. 3) within a particular coupler channel 203 or 207 as shown in FIGS. 3, 6A-6B, and 11. The forward end 257 may be configured to provide a smooth engagement with a particular coupler channel 203 or 207 as shown in FIGS. 3, 6A-6B, and 11. The tooth 258 configured or otherwise formed at an angle to engage and operably connect with the locking projection 222 of the cross member assembly 200 as shown in FIGS. 3 and 6A.

Figure 10:
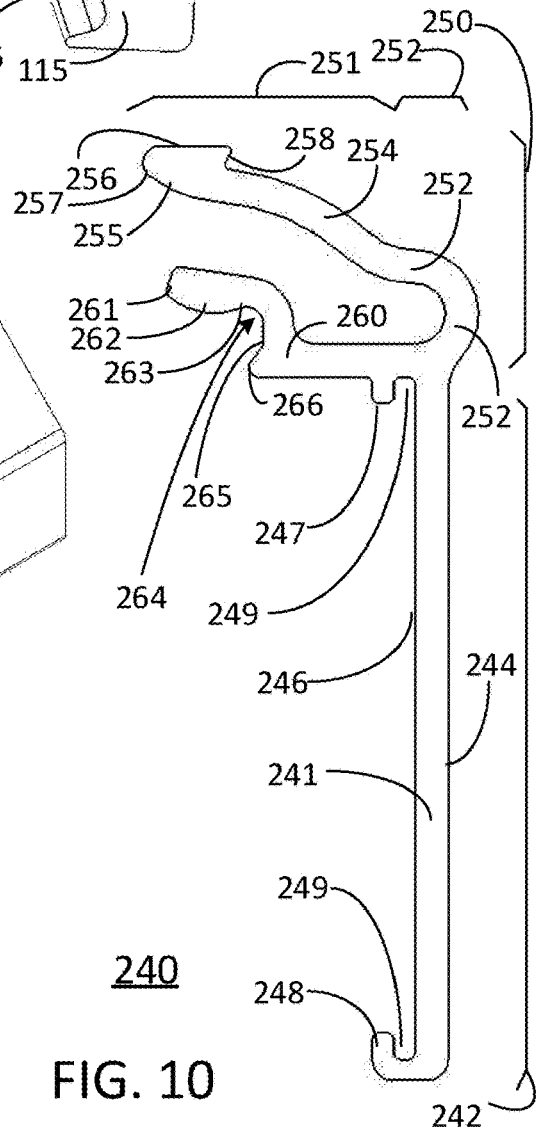
FIG. 10 is a side view illustrating an ice flag of the apparatus, system and method of the present invention

Referring to FIGS. 3, 10 and 11, the tooth 258 can be formed with an inward beveled edge forming a back angle of approximately forty degrees (40°), which is non-limiting, so that the tooth 258 prevents unwanted collapse of the tong 251 and spring 252 portions thereby releasing of the ice flag 240 from a coupler channel 203 or 207 of the cross member 200 by the applied force of snow, ice or other object imparting a force on back surface 244 of the lower segment 242. Similarly, the lower arm 260 may be configured with a nose 261 having an arcuate sliding surface 262, a proximal surface 263, a recess 264, a register edge 265 and a protrusion 266. The arcuate sliding surface 262 is configured to provide a smooth engagement and transition (e.g. to slide over the nub 220) with a particular coupler channel 203 or 207 as shown in FIGS. 3, 6A-6B, and 11. The recess 264 can be configured with a shape so as to align adjacent surfaces between the nub projection 220 on the cross member 200 and the surfaces of the proximal surface 263, the register edge 265 and the protrusion 266 of the ice flag 240. The connection between the nub 220 and the recess 264 is configured to prevent unwanted disengagement, release and/or collapse of the tong 251 and spring 252 portions thereby releasing of the ice flag 240 from a coupler channel 203 or 207 of the cross member 200 by the applied force of the load from snow, ice or other object imparting a force on back surface 244 of the lower segment 242. In addition, the protuberance or projection 266 adjacent the register edge 265 may be formed of a suitable length and extension to engage a portion of the lower surface 218 (e.g. lower surface 218a of coupler channel 203 as shown in FIGS. 3 and 11) so as to provide further engagement and locking of the ice flag 240 to the cross member 200, thereby preventing unwanted release therefrom by the applied force of snow, ice or other object imparting a force on back surface 244 of the lower segment 242. As discussed herein, the ice flag 240 may be placed at selectable predetermined heights for snow and/or ice retention purposes as desired (e.g. in a higher or lower position above the metal roof 104) by selection and insertion into the coupler channel 203 or 207 of the cross member 200.

Figure 9:
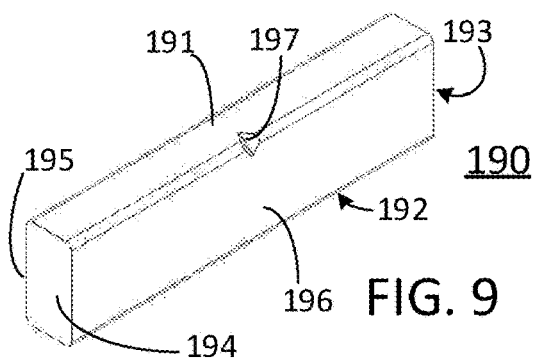
FIG. 9 is a side perspective view illustrating a connector of the apparatus, system and method of the present invention.

Referring to FIG. 9, a connector 190 may be configured to operably connect sections of the cross member 200 so as to create extended lengths on a metal roof 104 according to an embodiment of the retention apparatus, system and method 100 of the present invention. The connector 190 may be configured as an elongated bar or rod from suitable materials such as AISI 300 Series 1B-B stainless steel. A generally rectangular shaped connector 190 may be formed having a top 191, bottom 192, side 193, side 194, front 195, back 196 and a notch 197 at a mid-portion thereof. The notch 197 is useful to register the mid-portions of the connector when inserting into coupler channels 203, 205 and 207 of the cross member assembly 200. In operation, each of the coupler channels 203, 205 and 207 is configured to receive the connector 190 and sliding engagement thereof as shown in FIG. 6A. The dimensions of the connector 190 and the coupler channels 203, 205 and 207 may be adapted so that the connector 190 engages the side walls body 201, upper surface 217, lower surface 218 and locking projection 222. Additionally the connector 190 is configured to be received in the anchor arm extension 224 formed at a mid-portion of the body 201 and, more specifically within the box-like coupler formed by the body segment 201, portion 225, portion 227, and crossbar portion 226 as is illustrated in FIG. 11. In operation one or more connectors 190 may be inserted into one or all of the coupler channels 203, 205 and 207 to the mid-portion notch 197 in one cross member 200. Another cross member 200 may be aligned to one or all of the coupler channels 203, 205 and 207, as utilized, to receive the connector into corresponding coupler channels 203, 205 and 207.

Referring to FIGS. 1, 2, 5A-5D, 6A-6D and 7A, the retention apparatus, system and method 100 utilizes a clamp assembly 110 for mounting to a standing seam 102 of a metal roof 104. The clamp assembly 110 can be configured with an attachment shaft 113 opening to receive the fastener 180 so as to secure the top block 130 thereto with the cross member 200 there-between as described herein. The attachment shaft 113 may be formed smooth, threaded, or both, to secure to the threads 185 of the fastener 180, or alternatively made smooth for a self-tapping fastener 180 having a hardened composition that cuts threads in the 6063 aluminum alloy upon tightening. The clamp assembly 110 comprises a body 111 having a generally U-shaped form with downwardly extending legs 114 and 118 forming a slot 117 configured to receive the standing seam 102 of a metal roof 104. The body 111 is configured with an upper surface 112 having a generally planar shape with the attachment shaft 113 centrally located in the upper surface 112 for receiving a fastener 180 to attach items and objects thereto on the metal roof 104. The leg 114 is configured with a foot 115 and a toe portion 116 at an end of the generally downwardly extending leg 114 segment thereof configured to be located adjacent the standing seam 102 and underneath any crimped ends or roll of the standing seam 102 of the metal roof 104 inserted in slot 117. The foot 115 and toe portion 116 have an increased grip used advantageously to secure to the standing seam 102 in the slot 117, whereby the applied forces are spread across the standing seam 102 through the edge 116a of the toe portion 116 so as to increase a holding force as well as to reduce puncturing (e.g. causing a hole where water and elements may enter into the structure or home through the roof) or other damage such as, for example, to a paint or hydrophobic coating (e.g. Teflon®) of the metal roof. The leg 118 can be configured with an arcuate surface 119, one or more pins 120, 122 disposed in smooth pin channels 121, 123 formed in the leg 118 of the body 111 and extending to the slot 117 along a path to one or more pockets 129 formed the inner surface of the leg 114. The one or more pockets 129 are configured to cooperate with the pins 120, 122 for increasing the holding force of the clamp assembly 110, whereby in operation tightening the fastener urges the pins 120, 122 against the standing seam 102 causing an indentation or recess in the standing seam 102 by causing pressing force on the seam 102 between the end of the pins 120, 122 and the one or more pockets 129 on the leg 114. A suitable claim assembly 110 is manufactured by PMC Industries, Inc. identified by clamp product part Ace Clamp®, A2® and/or A2-N™. The clamp assembly 110 of the present invention has advantages of improved holding force configured to withstand harsh environmental conditions (e.g. heat, wind, vibration, seismic, storms and other forces) so as to maintain the clamp assembly 110 secured to the standing seam 102 such as, for example, seismic, vibration, wind, hurricanes, and other adverse conditions. The clamp assembly 110 of the present invention has advantages of improved holding force load characteristics of at least a thirty percent (30%) increase compared to conventional clamp assemblies such as, for example, increased holding force ranging approximately up to and including 1,600 lb. vertical load.

Additionally, according to an embodiment of the present invention, the arcuate surface 119 formed in leg 118 may be configured to allow forming the one or more pin channels 121, 123 corresponding to pins 120, 122 at a predetermined angle 172. The predetermined angle 172 may be established along the arcuate surface 119 such as, for example, in a range between predetermined angle 172*a* and predetermined angle 172*b*. Accordingly, the clamp assembly 110 can be configured during manufacture to change, vary or modify the predetermined angle 172 of the pins 120, 122 as desired so as to change where pins 120, 122 will press against the standing seam 102. Consequently, the leg 118 of the body 111 of the clamp assembly 110 provides for customization for different pin channels and configurations of the metal roof 106 available from various metal roof manufacturers.

For example, as illustrated by phantom lines 172*a* and 172*b* in FIG. 7A, certain metal roof 106 pin channels have different configurations of the standing seam 102, whereby fastener 124 and washer 128 of clamp assembly 110 may direct the pins 120, 122 along the predetermined angles 172*a* or 172*b*, so as to join the standing seam 102 sufficiently below the rolled metal of the seam for improved strength. Moreover, the clamp assembly 110 may be configured to direct the pins 120, 122 along the predetermined angle 172*b* so as to improve clearance for tools utilized by the installer, e.g. difficulty reaching and driving fasteners between standing seams 102 when certain tools are positioned horizontal and/or otherwise at angles parallel to the metal roof 104. In an alternative embodiment of the present invention, the leg 118 of the clamp assembly 110 may be formed offset pin channels 121, 123 along the arcuate surface 119, for example, a pin channel 121 formed at predetermined angle 172*a* and a pin channel 123 formed a predetermined angle 172*b* so as to offset the holding part of each pin 120, 122 whereby the washer 128 is of suitable size to urge pins 120, 122 against the standing seam 102.

As illustrated in FIG. 7C, the fastener 180 of the retention apparatus, system and method 100 further comprises a head 181, a washer 182 formed integral to the head with serrations 183 on the surface of the washer 182 oriented, for example, adjacent the top block, and an elongated shaft 184 that may be threaded 185. The fastener 180 may be formed from suitable materials having sufficient strength, durability, and ability to withstand environmental conditions such as, for example, a serrated flange hex head screw formed from AISI 300 Series stainless steel with dimensions of ⅜-16×1" long. According to an exemplary embodiment of the present invention, the fastener 180 may be used to secure the top block 132 the clamp assembly 110 by inserting the fastener 180 in the guide shaft 150 and the attachment shaft 113 of the clamp assembly. The fastener 180 and the fastener 122 for the clamp assembly 110 may be the same thereby providing the reduction in components of the retention apparatus and system 100 and advantages and cost and installation of the retention apparatus and system 100, whereby the cross member 200 may be inserted to the top block 130, emitting an audible sound (e.g. snap or clicking) for holding the cross member 200 securely that is advantageous in installations of the retention apparatus and system 100 on steep pitches of the metal roof 104, one person installations, whereby the audible sound provides the installer with information on the positive engagement of the cross member 200 as shown in FIGS. 5A-5D

In another embodiment of the present invention, as illustrated in FIGS. 5A-5D, the retention apparatus, system and method 100 may be configured preassembled with the fastener 180 secured through the top block 130 to the attachment shaft 113 of the clamp assembly 110 with the fastener 180 tightened to a predetermined distance 170, as shown in FIG. 5B. The predetermined distance 170 may be established as the distance for the anchor assembly 230 to be inserted so as to traverse the lip 142 to reach recess 146 to engage the hook portion 144 such as, for example, 0.125 inch or 3.25 mm, which is non-limiting, utilizing the pivot 151. The preassembled retention apparatus, system and method 100 may be formed with a suitable fastener 180 for example a threaded hex bolt inserted into the threaded channel 127 or a self-tapping threaded bolt secured in the attachment shaft 113. Alternatively, the preassembled retention apparatus, system and method 100 may be formed in a predetermined distance range 171, whereby the range is a distance such that (1) the anchor assembly 230 may be inserted to the recess 146 and (2) unwanted rotation of the top block 130 is prevented when the fastener 180 is tightened. The predetermined distance range 171 for unwanted rotation may be limited to where the tail of the flange 150 or the rotation surface 152 does not rise above the upper surface 112 of the body 111 of the clamp assembly 110. For example, the retention apparatus 100 has the fastener 180 and top block 130 affixed to the clamp body 111 at a predetermined distance range 171 set at, for example, approximately a range approximately between about 0.125 to 0.157 inches or 3.25 to 4.0 mm, as shown in FIG. 5C.

In an alternative embodiment of the present invention, as shown in FIG. 7B, the retention assembly 100 may be configured a spring or leaf spring 160 located between the top block 130 and the fastener 180 for biasing the top block 130 toward the clamp body 111. Accordingly, the fastener 180 may be disposed through a spring or leaf spring 160, the guide shaft 155 and secured to the attachment shaft 113 of the clamp assembly 110 so as to provide a spring-loaded attachment whereby the cross member 200 may be inserted to the latch assembly 14 of top block 130 clicking and holding the cross member 200 securely. The planar lower surface 139 of top block 130 is placed adjacent the upper surface 112 of clamp body 111 with the leaf spring 160 arranged on the upper surface 134 of the top block 130 aligning guide shaft 155 and attachment shaft 113 for inserting there-through the fastener 180 to affix securely to a clamp assembly 110. The embodiment of the present invention where the retention apparatus and system 100 is configured with the leaf spring 160 is advantageous for on person installations of the metal roof and where an audible sound provides the installer with information on the positive engagement of the cross member 200. The leaf spring 160 may be formed from suitable materials having sufficient strength, durability and ability to withstand environmental factors such as, for example, stainless steel with suitable bias and elastomeric properties when disposed on the seam 102 of a metal roof 104 for extended periods of time as shown in FIG. 6B. Consequently, the retention assembly, system and method 100 is configured to connect the anchor assembly 230 of the cross-member 200 using the leaf spring 160 providing biasing of the top block 130 against the fastener 180, whereby the cross member 200 may be inserted in the latch assembly 140 and snap into place and the fastener 180 may then be tightened uniformly to finalize the installation.

Figure 13A:
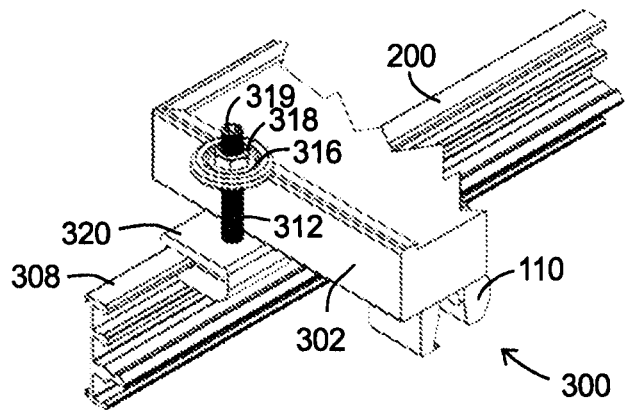
FIGS. 13A and 13B are top perspective views illustrating solar panel connector assembly, system and method in accordance with an embodiment of the present invention.
Figure 13B:
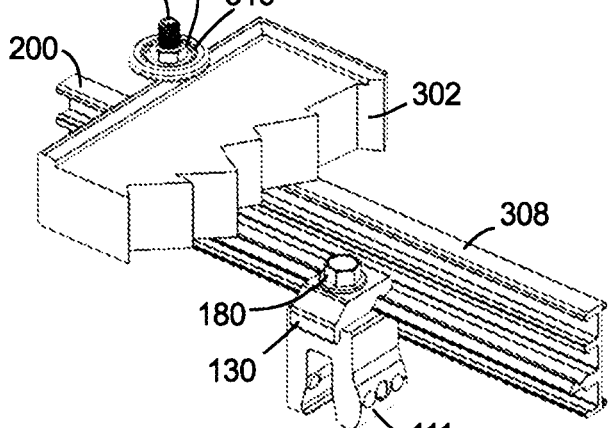
Figure 26:
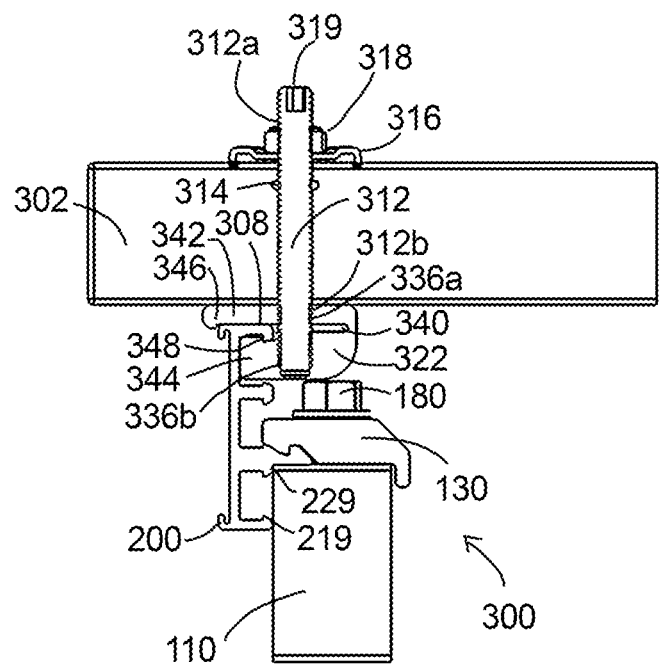
FIG. 26 is a schematic, cross sectional view, taken along lines A-A of FIG. 18 of the mount assembly, apparatus, system, and method in accordance with an embodiment of the present invention.
Figure 27:
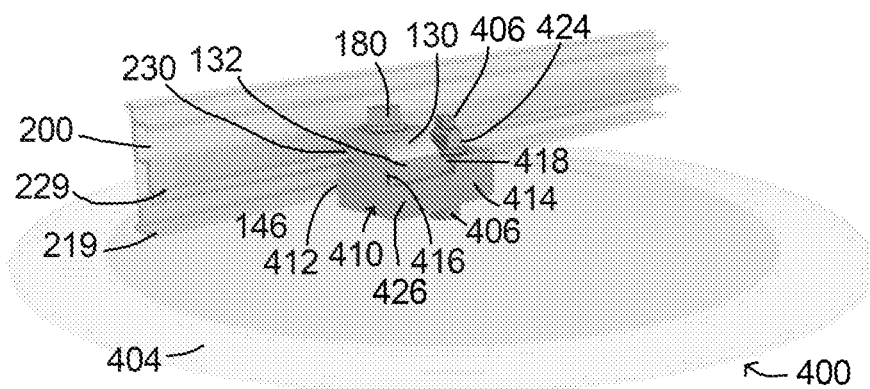
FIG. 27 is a schematic, perspective view of the mount assembly, apparatus, system, and method in accordance with an embodiment of the present invention.
Figure 28:
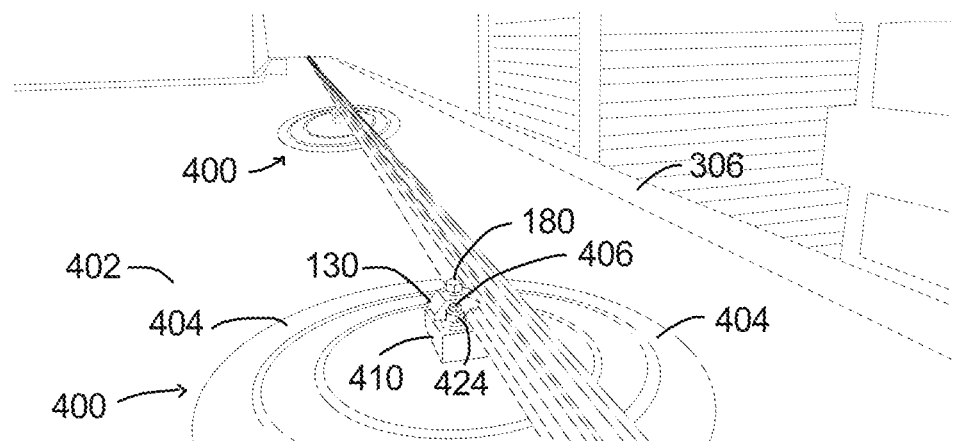
FIG. 28 is a schematic, perspective view of the mount assembly of FIG. 27 on a structure.

In an alternative embodiment of the present invention, as shown in FIGS. 13A-13B through 28, a solar panel connector assembly, system and method 300 is configured to use at least one fastener assembly 310, at least one clamp connector 320, at least one the top block 130 and a cross member 200 of the retention assembly 100 for securing and connecting a solar panel 302 to the retention apparatus system and method 100 by a clamp assembly 110 to a standing seam 102 of a metal roof 104 and/or to other object and/or structure 306 such as by a stanchion assembly 410, as illustrated in FIGS. 3, 5D, 6B, 13A-13B to 18, and 26-28. For example, as illustrated in FIGS. 3, 5D, 6B, 13A-13B to 18, the clamp assembly 110 it is configured to secure the cross member 200, top block 130, and fastener 180 to the metal roof 104. In another embodiment, shown in FIGS. 27 and 28, a stanchion assembly 410 it is configured to secure the cross member 200, top block 130, and fastener 180 to another object 306. As illustrated in FIGS. 13A-13B-18, and 26, the cross member 200 can be configured with an upper portion 308 formed as a planar surface on the body 201 with and the extension 216 projecting from the back surface 214 configured to connect using slot assembly 340. Consequently, the strength of the retention assembly 100 may be utilized to support the weight of the solar panel 302 such that the solar panel 302 may be secured by a solar fastener to the clamp connector assembly 320 that advantageously provides the outward visual appearance of the color matching panel 106 secured in the cross member 200.

Figure 25:
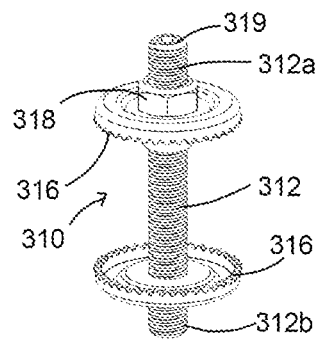
FIG. 25 is a schematic, perspective view of the fastener assembly.

For example, as shown in FIGS. 13A-13B-18, and 25-26, solar panel connector assembly, system and method 300 comprises a fastener assembly 310 configured to be received by the portion of the clamp connector 320. The fastener assembly 310 may be received in an opening 336 (a hole formed in a top portion 324 of the clamp connector 320. The clamp connector 320 it is configured for operably connecting by a coupler channel 207 of the cross member 200. As illustrated in FIGS. 25 and 26, the fastener assembly 310 may be configured a rod 312, at least one solar cap 316, and a fastening element 318 that can be a nut, wing-nut, compression and other suitable fastening element to join to upper portion 312a of the rod 312 and secure the solar panel 302. The rod 312 may be formed fully threaded, or partially threaded with an upper portion 312a and a lower portion 312b threads formed on rod 312, and a recess adapted to receive a tool for driving (e.g. tightening) the lower portion 312b to the opening 336 in the clamp connector 320. The opening 336 may be configured threaded to receive lower portion 312b and/or formed smooth for a self-tapping threads on lower portion 312b. Additionally, the recess 319 may be configured integral to the rod 312 as socket for an Allen head that is adapted to receive an Allen head tool for driving the rod 312 into the opening 336, although, other socket shapes and tool standards may be used. The fastener assembly 310 may further be configured with an insulator element 314 disposed on the rod 312 such as an O-ring for reducing impacts with the rod 312 and the edges of the solar panel 302.

As illustrated in FIG. 26, the clamp connector 320 comprises a body 322 that may be formed by extrusion manufacturing and cut to suitable lengths. The body 322 can be configured with an upper portion 324, a lower portion 326, a front portion 328, a rear portion 330, left and right side portions 332 and 334, respectively, and may be also configured with a arcuate surface 338 for additional clearance between assembly parts. The body 322 further comprises a slot assembly 340 formed between the upper portion 342, lower portion 344, and extending in a portion of the body 322. A lip portion 346 may be configured on the upper portion 342 of the clamp connector 320 to engage and upper edge on the front surface of the cross member 200. The lower portion 344 may be configured with a removed material portion or slit portion 348 to receive the tooth 258, as shown in FIGS. 3, 10-11, and 26. The body 322 is configured with an opening 336 forming a channel for receiving lower portion 312b. The opening 336 extending longitudinally through the upper portion 342 in upper portion opening 336 and into the lower portion 344. The opening 336 may be configured to extend through the lower portion 344, and/or lower portion opening 336b partially through the lower portion 344 of the body 322, as illustrated in FIGS. 22 and 26, forming a stop 350 for the lower portion 312b of the rod 312. The stop 350 advantageously can register the fastener assembly 310 in a consistent position for improved clamping of the slot assembly 340 and the cross member 200.

Figure 14:
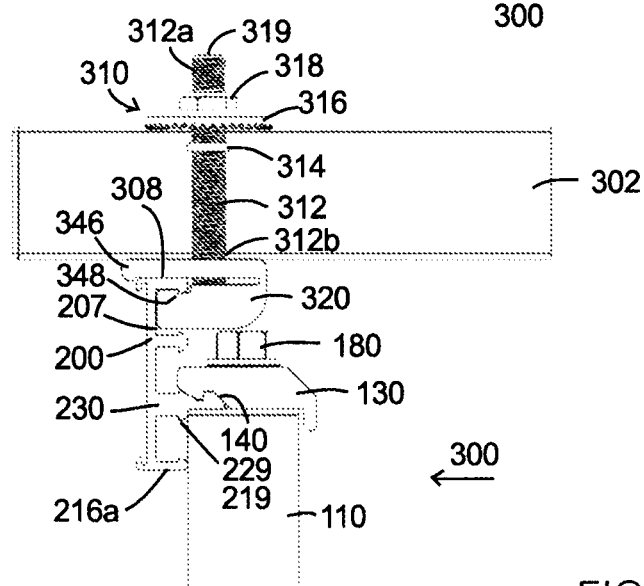
FIG. 14 is a side view illustrating a solar panel connected to a cross member and solar panel connector assembly thereof.
Figure 15:
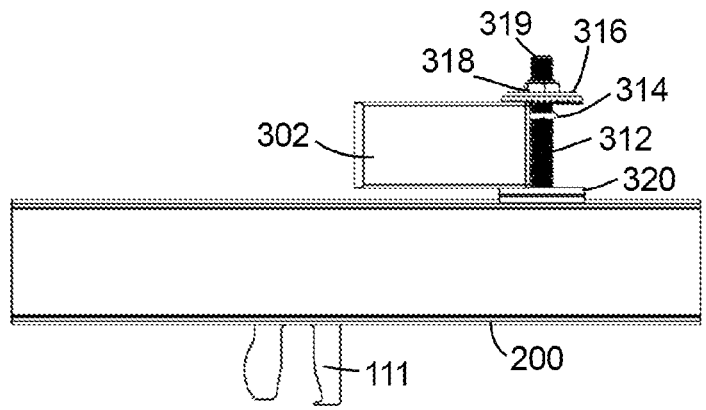
FIG. 15 is a front view illustrating a solar panel connected to a cross member and solar panel connector assembly thereof.
Figure 16:
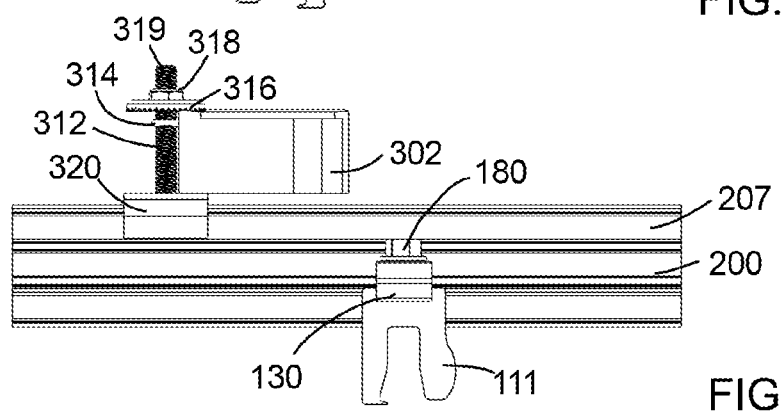
FIG. 16 is a rear view illustrating a solar panel connected to a cross member and solar panel connector assembly thereof.
Figure 17:
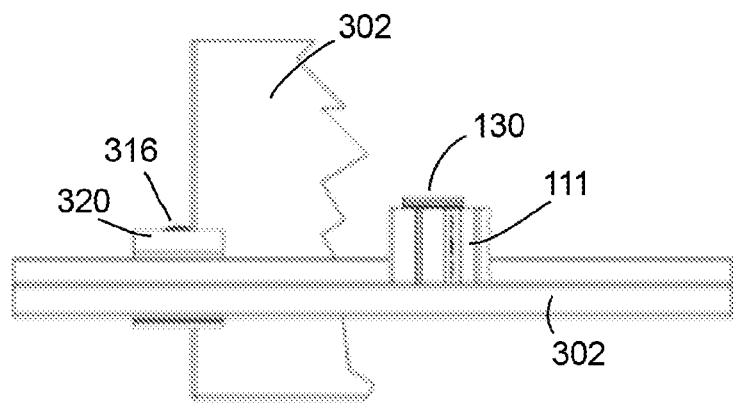
FIG. 17 is a bottom view illustrating a solar panel connected to a cross member and solar panel connector assembly thereof.
Figure 18:
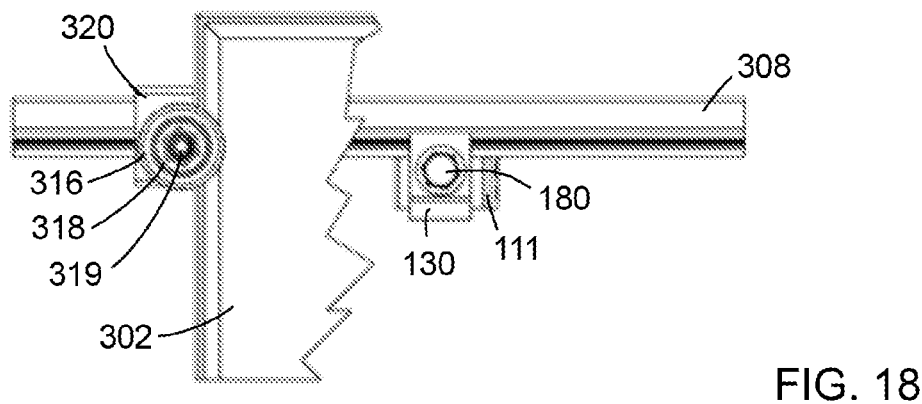
FIG. 18 is a top view illustrating a solar panel connected to a cross member and solar panel connector assembly thereof.

In operation, as shown in FIGS. 13A-13B to 26, the clamp connector 320 may be configured to position in the coupler channel 207 of the cross member 200, as shown in cross section and side views FIGS. 14 and 26. The fastener assembly 310 may be configured to be received in the hole 336 using suitable tools for providing a rotational force applied to a recess 319 to force together an upper portion 342 and a lower portion 344 so as to operably connect the clamp connector assembly 320 to the cross member 200. For example, the rod 312 may be configured the recess 319 such as, for example, adapted to receive a Allen socket or other shape, and be threaded on at least an upper portion 312a and a lower portion 312b providing clockwise, or counterclockwise, whereby in this manner the engagement of the rod 312 threads of the lower portion 312b provides clamping movement of the top portion 324 and bottom portion 326 thereby engaging the upper portion to upper portion 308, as shown in FIGS. 13A-13B, and lower portion 344 in the coupler channel 207. In another step, the solar panel 302 may be positioned to rest upon the top portion 324 of clamp connector 320. The solar cap or other grounding washer 316 with an opening for positioning on the upper portion 312a threaded on the rod 312 so that the solar cap 316 and solar panel 302 can be operably connected by a fastening element 318.

As is illustrated in FIGS. 27 and 28, according to another embodiment of the present invention, a mounting assembly of the present invention generally shown as 400 that may be utilized in installations on a membrane roof 402 of the structure 306, e.g. roofing materials including concrete, metal roofing, shingle, tile, and/or other modern membrane roofing where the nature of the substrate is rolled sheeting roofing material. The mounting assembly 400 is suitable, as described in this embodiment, for attaching a cross member to a surface of the membrane roofing 402 for providing snow and/or ice retention, e.g. a snow fence for a roof. The mounting assembly 400 can use a flashing and/or membrane roofing pad 404 adapted with a post 406 extending from the membrane roofing pad 404. The membrane roofing pad 404 with post 406 is commercially available from OMG Inc., Agawam, Ma. as the PowerGrip® brand and utilized in installations where by circular holes may be cut in membrane roofing with the substructure for the post being secured to the structure of the roof, and then sealed to the adjoining membrane roofing is so as to form and integrally sound roof, e.g. a sealed waterproof surface.

The mounting assembly 400 comprises a stanchion assembly 410 formed from generally uniform block of material such as, for example, metals, metal alloys that may be extruded or otherwise formed into the particular block shape, e.g. aluminum. The stanchion assembly 410 may be configured in a generally rectangular block shape having a first surface 412 with a generally uniform edge configured to abut the elements 219, 229 of the cross member 200, and a second surface 414 (an aft surface) having a notch 416 formed an opposite edge portion 418. The stanchion assembly 410 includes an opening 420 in the first portion 414 of the stanchion assembly 410 so as to operably connect a fastener element 424 (e.g. a nut, wing-nut, compression and other suitable fastening element) to join to the post 406 extending through a hole 420 formed in the first portion 414. The notch 416 on the opposite edge portion 418 is configured to receive a top block 130 with downwardly extending flange 150 operably pivoting in the notch 416; and, on the another side, by (1) the anchor assembly 230 operably connected to the recess 146; and (2) the clamp stand-off surfaces 219 and 229 of the cross member 200 operably engaging the first surface 412 of the stanchion assembly 410. The top block 130 includes an opening 422 in the second portion 426 of the stanchion assembly 410 so as to operably connect a fastener 180 to the top block 130, the anchor assembly 230 and the stanchion assembly 410, for example, by passing the fastener 180 through the channel 155 in the top block 130 aligned with opening 422 formed adjacent the notch 416 and/or opposite edge portion 418 so as to operably connect the second portion 426 of the stanchion assembly 410.

As shown in FIGS. 13A-13B, the cross member 200 can be configured with an upper surface 308 formed planar and configured to operably connect anchor assembly 230 to the top block 130 and to operably engage the extension 231 and the clamp stand-off surfaces 219, 229. The anchor assembly 230 may be joined using the fastener 180 to secure between the top block 130 to the stanchion assembly 410. The stanchion assembly 410, and top block 120 may be pre-assembled with the fastener 430 to a dimension whereby a cross member 200 can be joined to the mounting assembly 410 by driving fastener 180 (e.g. tightened) to the stanchion assembly 410 to secure the cross member 200 thereto for retaining snow and/or ice on the roof or other structure.

While certain configurations of structures have been illustrated for the purposes of presenting the basic structures of the present invention, one of ordinary skill in the art will appreciate that other variations are possible which would still fall within the scope of the appended claims. Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for securing a device to a structure, said apparatus comprising:
   a mounting assembly secured to the structure;
   a cross member assembly secured to said mounting assembly using a fastener and a top block having a latch assembly and a rearward flange, said cross member assembly comprising a body having a front surface and a back surface, said back surface provided with two or more segments formed by an anchor arm extension and at least one arm extension, said anchor arm extension extending generally transverse from said back surface of said body comprising an anchor assembly adapted to operably connect to said latch assembly and said top block, said at least one arm extension extending generally transverse from said back surface of said body comprising a coupler channel;
   a clamp connector configured to position in said coupler channel of said cross member, said clamp connector comprising a body portion having an upper portion joined to a lower portion, said upper portion having an opening formed between a top surface and bottom surface of said upper portion, said lower portion having said opening extending at least partially into said lower portion, a front portion, a rear portion, side portions and a slot assembly formed in said front portion and between said upper portion and said lower portion extending partially in said body portion, said upper portion having a lip portion dimensioned to extend said upper portion over said lower portion, said lower portion having a slit portion formed in a top surface of said lower portion, said slit portion formed in said lower portion between said side portions and transverse to said slot; and
   a device fastener assembly configured to be received in said opening in said upper and lower portions of said clamp connector, said device fastener assembly comprising a rod having threads on at least a lower portion and an upper portion thereof, said upper portion of said rod configured with a recess for providing a rotational force applied to said recess to force said slot together so as to operably connect said clamp connector in said coupler channel of said cross member.

2. The apparatus of claim 1, wherein said clamp connector comprises said slit portion on said lower portion of said slot assembly, said slit portion configured to be aligned adjacent a tooth of said coupler channel of said cross member.

3. The apparatus of claim 1, wherein said device fastener assembly includes a solar cap having an opening for positioning on said threaded upper portion of said rod, said solar cap configured to operably connect said device to said opening of said clamp connector.

4. A retention apparatus for securing to a structure, said apparatus comprising:
   a mounting assembly with a threaded post operably connected thereto, said mounting assembly configured to be secured to the structure;
   a cross member, said cross member comprising a body having a front surface and a back surface, said back surface having two or more segments comprising an anchor arm extension and at least one arm extension, said anchor arm extension extending generally transverse from said back surface of said body with an anchor assembly at an end portion thereof, said at least one arm extension extending generally transverse from said back surface and operably contacting said mount surface of said mount body;
   a top block comprising a body having an upper surface, a lower surface, and an opening extending between said upper surface and said lower surface, said top block further comprising a flange extending from said lower surface and a latch assembly located on a side opposite said flange; and
   a fastening element, said fastening element configured to be received on said threaded post for joining said anchor assembly to said latch assembly operably connecting said cross member between said top block and said mounting assembly, thereby securing the retention apparatus to the structure.

5. The retention apparatus of claim 4, wherein said mounting assembly is a membrane pad configured with said threaded post, said membrane pad is joined to a membrane roof structure having said threaded post extending therefrom.

6. The retention apparatus of claim 4, wherein said fastening element is a nut to be received on a threaded portion of said post for joining said mounting assembly to said membrane roof structure.

7. The retention apparatus of claim 4, wherein said cross member further comprises said at least one arm extension extending generally transverse from said back surface of said body comprising a coupler channel adapted to receive a connector so as to join another of said coupler channel in another said cross member thereto.

8. The retention apparatus of claim 4, wherein said anchor arm is configured to operably connect to said latch assembly and said top block.

* * * * *